US011746041B2

(12) United States Patent
Dejneka et al.

(10) Patent No.: US 11,746,041 B2
(45) Date of Patent: *Sep. 5, 2023

(54) GLASS-CERAMICS AND GLASS-CERAMIC ARTICLES WITH UV- AND NIR-BLOCKING CHARACTERISTICS

(71) Applicant: CORNING INCORPORATED, Corning, NY (US)

(72) Inventors: Matthew John Dejneka, Corning, NY (US); Stuart Gray, Corning, NY (US); Jesse Kohl, Horseheads, NY (US); Stephan Lvovich Logunov, Corning, NY (US)

(73) Assignee: Corning Incorporated, Corning, NY (US)

( * ) Notice: Subject to any disclaimer, the term of this patent is extended or adjusted under 35 U.S.C. 154(b) by 380 days.

This patent is subject to a terminal disclaimer.

(21) Appl. No.: 16/769,899

(22) PCT Filed: Dec. 4, 2018

(86) PCT No.: PCT/US2018/063792
§ 371 (c)(1),
(2) Date: Jun. 4, 2020

(87) PCT Pub. No.: WO2019/113029
PCT Pub. Date: Jun. 13, 2019

(65) Prior Publication Data
US 2020/0399167 A1    Dec. 24, 2020

Related U.S. Application Data

(60) Provisional application No. 62/615,094, filed on Jan. 9, 2018, provisional application No. 62/594,302, filed on Dec. 4, 2017.

(51) Int. Cl.
| | | |
|---|---|---|
| *C03C 10/02* | (2006.01) | |
| *C03C 10/00* | (2006.01) | |
| *B60J 3/00* | (2006.01) | |
| *C03B 32/02* | (2006.01) | |
| *C03C 4/08* | (2006.01) | |
| *E06B 9/24* | (2006.01) | |

(52) U.S. Cl.
CPC ........... *C03C 10/0054* (2013.01); *B60J 3/007* (2013.01); *C03B 32/02* (2013.01); *C03C 4/082* (2013.01); *C03C 4/085* (2013.01); *C03C 10/0018* (2013.01); *C03C 10/0027* (2013.01); *E06B 9/24* (2013.01); *C03C 2204/00* (2013.01)

(58) Field of Classification Search
CPC ................................................. C03C 10/00
See application file for complete search history.

(56) References Cited

U.S. PATENT DOCUMENTS

| | | | |
|---|---|---|---|
| 3,293,052 A | 12/1966 | Sawchuk et al. | |
| 3,457,106 A | 7/1969 | Gillery | |
| 3,499,775 A | 3/1970 | Turner, et al. | |
| 3,985,534 A | 10/1976 | Flannery et al. | |
| 4,303,298 A | 12/1981 | Yamashita | |
| 5,393,593 A | 2/1995 | Gulotta et al. | |
| 5,565,388 A | 10/1996 | Krumwiede et al. | |
| 5,668,066 A | 9/1997 | Oguma et al. | |
| 6,048,621 A | 4/2000 | Gallego et al. | |
| 6,114,264 A | 9/2000 | Krumwiede et al. | |
| 6,196,027 B1 | 3/2001 | Varanasi et al. | |
| 6,274,523 B1 | 8/2001 | Krumwiede et al. | |
| 6,911,254 B2 | 6/2005 | Fisher et al. | |
| 7,192,897 B2 | 3/2007 | Yamane et al. | |
| 7,517,822 B2 | 4/2009 | Fechner et al. | |
| 7,675,001 B2 | 3/2010 | Leyvraz | |
| 8,872,870 B2 | 10/2014 | Witzmann et al. | |
| 10,246,371 B1 * | 4/2019 | Dejneka | .................. C03C 4/082 |
| 10,365,499 B2 | 7/2019 | Schaur et al. | |

(Continued)

FOREIGN PATENT DOCUMENTS

| | | |
|---|---|---|
| CN | 1653007 A | 8/2005 |
| DE | 10353756 A1 | 6/2005 |

(Continued)

OTHER PUBLICATIONS

Chen et al., "Preparation and near-infrared photothermal conversion property of cesium tungsten oxide nanoparticles," Nanoscale Res. Lett., 8, 57 (2013).

Dickens et al., "The Tungsten Bronzes and Related Compounds," J. Amer. Chem. Soc., 81, 5556 (1981).

Efficient Windows Collaborative, "Window Technologies: Low-E Coatings" Available Online at<https://web.archive.org/web/20190110014050/https://www.efficientwindows.org/lowe.php>,Jan. 2019, 3 pages.

Global Marketing Insights, "Market research reports, Latest Published Report", Available Online <https://web.archive.org/web/20200929082752/https://www.gminsights.com/> Retrieved on Sep. 29, 2020, pp. 6.

(Continued)

*Primary Examiner* — Karl E Group

(57) ABSTRACT

Embodiments of a glass-ceramic, glass-ceramic article or glass-ceramic window that includes 40 mol %≤$SiO_2$≤80 mol %; 1 mol %≤$Al_2O_3$≤15 mol %; 3 mol %≤$B_2O_3$≤50 mol %; 0 mol %≤$R_2O$≤15 mol %; 0 mol %≤RO≤2 mol %; 0 mol %≤$P_2O_5$≤3 mol %; 0 mol %≤$SnO_2$≤0.5 mol %; 0.1 mol %≤$MoO_3$≤15 mol %; and 0 mol %≤$WO_3$≤10 mol % (or 0 mol %<$MoO_3$≤15 mol %; 0.1 mol %≤$WO_3$≤10 mol %; and 0.01 mol %≤$V_2O_5$≤0.2 mol %), wherein the $WO_3$ (mol %) plus the $MoO_3$ (mol %) is from 1 mol % to 19 mol %, and wherein $R_2O$ (mol %) minus the $Al_2O_3$ (mol %) is from −12 mol % to 4 mol %, are disclosed.

13 Claims, 8 Drawing Sheets

(56) References Cited

U.S. PATENT DOCUMENTS

| | | | |
|---|---|---|---|
| 10,370,291 B2 | 8/2019 | Dejneka et al. | |
| 10,450,220 B2 | 10/2019 | Dejneka et al. | |
| 10,807,906 B2 | 10/2020 | Dejneka et al. | |
| 10,829,408 B2 | 11/2020 | Dejneka et al. | |
| 11,046,609 B2 | 6/2021 | Dejneka et al. | |
| 11,053,159 B2* | 7/2021 | Dejneka | C03C 4/02 |
| 11,312,653 B2* | 4/2022 | Dejneka | C03C 10/0009 |
| 11,351,756 B2* | 6/2022 | Dejneka | C03C 10/0054 |
| 2002/0072461 A1 | 6/2002 | Akimoto et al. | |
| 2005/0025182 A1 | 2/2005 | Ala | |
| 2005/0151116 A1 | 7/2005 | Fechner et al. | |
| 2008/0193686 A1 | 8/2008 | Loergen et al. | |
| 2014/0256865 A1 | 9/2014 | Boulton et al. | |
| 2015/0093554 A1 | 4/2015 | Estinto et al. | |
| 2016/0031755 A1 | 2/2016 | Hoppe et al. | |
| 2017/0261765 A1 | 9/2017 | Dangelmaier et al. | |
| 2017/0362119 A1 | 12/2017 | Dejneka et al. | |
| 2018/0170804 A1 | 6/2018 | Witzmann et al. | |
| 2018/0273419 A1 | 9/2018 | Annamalai et al. | |
| 2019/0177206 A1 | 6/2019 | Dejneka et al. | |
| 2019/0177209 A1 | 6/2019 | Dejneka et al. | |
| 2019/0177211 A1 | 6/2019 | Dejneka et al. | |
| 2019/0177212 A1 | 6/2019 | Dejneka et al. | |
| 2019/0256408 A1 | 8/2019 | Dejneka et al. | |
| 2020/0002220 A1 | 1/2020 | Dejneka et al. | |
| 2020/0255327 A1 | 8/2020 | Dejneka et al. | |
| 2020/0399167 A1 | 12/2020 | Dejneka et al. | |
| 2020/0399168 A1 | 12/2020 | Dejneka et al. | |
| 2021/0070018 A1* | 3/2021 | Dejneka | C03C 3/091 |
| 2021/0284572 A1 | 9/2021 | Dejneka et al. | |
| 2022/0009823 A1 | 1/2022 | Dejneka et al. | |
| 2022/0162114 A1* | 5/2022 | Dejneka | C03C 10/0009 |
| 2022/0258455 A1* | 8/2022 | Dejneka | B32B 17/101 |

FOREIGN PATENT DOCUMENTS

| | | |
|---|---|---|
| EP | 1705161 A1 | 9/2006 |
| KR | 10-1061056 B1 | 9/2011 |
| TW | 264422 B | 12/1995 |
| WO | 03/97544 A1 | 11/2003 |
| WO | 2019/051408 A2 | 3/2019 |
| WO | 2021/183281 A1 | 9/2021 |

OTHER PUBLICATIONS

Green et al., "Optical properties of dilute hydrogen tungsten bronze thin films," J. Appl. Phys. 74, 3451 (1993).

Guo et al., "Highly efficient ablation of metastatic breast cancer using ammonium-tungsten-bronze nanocube as a novel 1064 nm laser-driven photothermal agent," Biomaterials 52, 407-416 (2015).

Infomine, "Molybdenum Prices and Molybdenum Price Charts", Available Online at < https://web.archive.org/web/20190213135842/http://www.infomine.com/investment/metal-prices/molybdenum-oxide/>, Retrieved on Feb. 13, 2019, pp. 2.

International Search Report and Written Opinion of the International Searching Authority; PCT/US18/63792; dated May 14, 2019; 14 pages; European Patent Office.

Kaliyev, "What are Tungsten Bronzes," EIR vol. 20, No. 17, Apr. 30, 1993.

Kim et al., "Near Infrared Cut-off Characteristics of various Perovskite-based Composite Films," IPCBEE, 43, 9 (2012).

Knoema, "Minerals, Ores and Metals » Tungsten APT, European market ($/mtu)", Available Online at < https://knoema.com/UNCTADFMCP2015Feb/free-market-commodity-prices-monthly-update?tsId=1001760>, Aug. 2016, 2 pages.

Lee el al., "A Study on Toughened Glass Used for Vehicles and its Testing Methods," http://www-esv.nhtsa.dot.gov/Proceedings/24/files/24ESV-000152.PDF.

Low-e Glass, "Blending Natural Views with Solar Efficiency" Available Online at <https://web.archive.org/web/20150905121620/http://www.ppgideascapes.com/Glass/Products/Low-E-Glass.aspx> Retrieved on Sep. 5, 2015, 2 Pages.

M. Rouhani, "Photochromism of Molybdenum Oxide," National University of Singapore, PhD thesis, NUS Graduate school for Integrative Sciences and Engineering, 2013.

Moon et al., "Near Infrared Shielding Properties of Quarternary Tungsten bronze Nanoparticles Na0.11Cs0.22WO3," Bull. Korean Chem. Soc. 34 [3], 731 (2013).

Motor Trend Network, "Vehicles Offering Panoramic Sunroofs for Less Than $50,000", Available Online <https://web.archive.org/web/20190812165227if_/https://www.motortrend.com/news/vehicles-offering-panoramic-sunroofs-for-less-than-50000> Retrieved on Aug. 12, 2019, 13 page.

Poirier et al., "Redox Behavior of Molybdenum and Tungsten in Phosphate Glasses," J. Phys. Chem. B, 112(15), 4481 (2008).

Saflex, "Rethink color with Saflex interlayers", pp. 4 https://www.saflex.com/pdf/en/sseriesproductbrochure.pdf.

Saflex® SG solar absorbing PVB, Advanced interlayer technology for laminated glass, Available Online at <https://web.archive.org/web/20160807020609/https://www.saflex.com/pdf/en/AI-Arch-009a_Saflex_SG_Solar_A4.pdf> Retrieved on Aug. 7, 2016, 2 pages.

Shi et al., "Hydrothermal Synthesis of CsxWO3 and the Effects of N2 annealing on its Microstructure and Heat Shielding Properties," J. Mater. Sci. Technol., 30 [4], 342 (2014).

Solar Color Series, "VistaGray® and GL-20™" Available Online < https://web.archive.org/web/20151116112852/http://www.pgwglass.com/products/Pages/OEMgVistaGrayGL-20.aspx > Retrieved on Nov. 16, 2013 , 2 pages.

Song et al., "Hydrophilic Molybdenum Oxide Nanomaterials with Controlled Morphology and Strong Plasmonic Absorption for Photothermal Ablation of Cancer Cells," ACS. Appl. Mater. Interfaces, 6(6), 3915-3922 (2014).

Sunroof—Wikipedia, Available Online <https://en.wikipedia.org/wiki/Sunroof> Jan. 7, 2021, 6 Pages.

Syed et al., "Some properties of sodium tungsten bronzes as a function of sodium concentration," Indian Journal of Chem. Tech., 12, 204 (2005).

Tanaka et al., "Phase Separation of Borosilicate Glass with Molybdenum Oxide Addition and Pore Structure of Porous Glass," J. Ceram. Assoc. Japn, vol. 93 [1083], pp. 700-707 (1985).

The Wayback Machine, "Solar Energy Spectrum", Available Online at < https://web.archive.org/web/20161018054938/http://educationcenter.ppg.com/images/glasstopics/LOW-E%20COATING%201.jpg> Retrieved on Oct. 18, 2016, 1 Page.

Z. Hussain, "Optical and Electrochromic Properties of Annealed Lithium-Molybdenum-Bronze Thin Films," J. Electronics Materials, vol. 31 [6], 2002.

Zeng et al., "The preparation of a high performance near-infrared shielding CsxWO3/SiO2 composite resin coating and research on its optical stability under ultraviolet illumination," J. Mater. Chem. C, vol. 3, 2015, pp. 8050-8060.

Kang et al; "Refractive Index Patterning of Infrared Glass Ceramics Through Laser-Induced Vitrification Invited"; Optical Materials Express, vol. 8, No. 9, Sep. 1, 2018, pp. 1-12.

Klyukin, etal., "Fluorescent clusters in chloride photo-thermo-refractive glass by femtosecond laser bleaching of Ag nanoparticles", Optics Express 12944, 2017, vol. 25, No. 11, pp. 1-8.

V. P. Vieko, Q. K. Kieu, N. V. Nikonorov, znd P. A. Skiba, "On the Reversibility of Laser-induced Phase-structure Modification of Glass-ceramics". JLMN—Journal of Laser Micro/Nanoengineering vol. 1, No. 2, 2006.

Veiko et al; "Physical Mechanisms of Fast Structure Modification and the Appearance of Waves of Optical Bleaching in Glass Ceramics"; Laser Physics, 2008, vol. 18, No. 4, pp. 363-373.

Veiko et al; "Waves of Optical Bleaching Caused by Continuously Operated, YAG Laser Radiation in Glass-Ceramics"; Proceedings of SPIE; vol. 6985, 2008, pp. 1-9.

"Radio and Microwave Frequency Attenuation in Glass", PPG Glass Technical Document, ID-151, PPG Industries Inc.

Adachi et al., "Chromatic instabilities in cesium-doped tungsten bronze nanopartides," J. Appl. Phys., 115 194304 (2013).

Autos, "Supersizing the Sunroof, Even in Economy Cars", The Wall Street Journal, Available Online < https://web.archive.org/web/

(56) References Cited

OTHER PUBLICATIONS

20180329041836/https://www.wsj.com/articles/SB10001424127887324024004578173271481039256>Dec. 2012, 1 page.
Autover, "Thermocontrol Venus", Saint Gobian, Available Online < https://web.archive.org/web/20191227224530/http://www.saint-gobain-autover.com/thermocontrol-venus-for-auto-glass > Retrieved on Dec. 27, 2019, 1 page.
AxleGeeks, "Compare Cars with Panorama Sunroof", Available Online < https://web.archive.org/web/20150919055004/http://cars.axlegeeks.com/d/x/Panorama-Sunroof> Retrieved on Sep. 19, 2015, pp. 4.

* cited by examiner

GLASS-CERAMICS AND GLASS-CERAMIC ARTICLES WITH UV- AND NIR-BLOCKING CHARACTERISTICS

CROSS-REFERENCE TO RELATED APPLICATIONS

This application is a 371 of PCT Application No.: PCT/US2018/063792 filed on Dec. 4, 2018, which claims the benefit of priority of U.S. Provisional Application Ser. No. 62/594,302 filed on Dec. 4, 2017 and U.S. Provisional Application Ser. No. 62/615,094 filed on Jan. 9, 2018 the contents of which are relied upon and incorporated herein by reference in their entirety as if fully set forth below.

FIELD OF THE DISCLOSURE

The disclosure relates to glass-ceramic materials and articles with UV- and NIR-blocking attributes, and more particularly, articles and patterned articles that comprise mixed molybdenum-tungsten oxide-doped, molybdenum oxide-doped and tungsten-vanadium oxide-doped aluminoborosilicate compositions. The disclosure also relates to methods of making these materials and articles.

BACKGROUND

In the past years, automotive OEMs have increasingly fitted vehicles with 'larger-than-average' sunroofs, termed 'panoramic sunroofs,' that are able to open and let light and fresh air into the cabin. These systems are a new type of large multi-panel 'moonroof' that offer glass coverage above both the front and rear seats. Panoramic roof systems are now available on over thirty vehicle makes and models. Further, it is evident that these roof systems are penetrating all market segments, which makes it a significant opportunity for glass makers. According to Global Market Insights, Inc., the automotive sunroof market size is forecasted to reach $9.76 billion by 2022 in large part due to rising number of factory-installed moonroof-type sunroofs.

While this may be a large opportunity, panoramic sunroofs also bring new and unprecedented challenges to glazing manufacturers. These include making them mechanically robust, lightweight, and sound-proof, while providing good light management to ensure eye safety and comfort of the vehicle occupant(s). Further, 'light-weighting' associated with large sunroofs can reduce fuel efficiency by up to 2 miles per gallon. Conventional sunroofs have been generally made of a single ply of thermally toughened tinted glass with edges coated with an opaque glass frit. However, this design has been shown to be insufficiently robust for panoramic sunroof applications due to loss of thermal tempering during the application of the frit coating. Laminated sunroofs comprised of two 'thick' plies of soda-lime glass offer increased mechanical robustness and good light management (due to increased thickness), but significantly increase weight. Other 'thick-thin' laminated sunroofs fabricated from one thick soda-lime glass substrate and one strengthened glass laminate offer good mechanical robustness and reduce weight, but can require the use of expensive coatings or tinted interlayers to meet appropriate optical requirements, including blocking ultraviolet (UV) and infrared (IR) wavelengths.

Tint specifications for panoramic sunroof glazing require strong UV and IR attenuation with a visible light transmittance of less than 20%. Many OEMs are interested in lower visible transmittance (T) (4%≤T≤10%) to further reduce the solar heat load on the vehicle. Conventional tinted sunroof and privacy glazing can be produced by doping glass with UV and IR absorbing species including Fe, V, Ce, and or Cu. Other transition metals (e.g., Se, Co and Ni) can be used to block specific visible wavelengths to tune the color of the glass, or to produce a neutral grey tint. The two most absorptive commercially available tint glasses for sunroof glazing are Saint-Gobain Corporation Thermocontrol Venus® VG10 Deep Grey Tinted Glass ("VG10") and PPG Industries, Inc. GL20 privacy glass ("GL20"). At a 2.1 mm thickness, the average transmittance across the visible spectrum (400-700 nm) is 28% for VG10 and 38.6% for GL20. Thus, to meet a sunroof specification of 10% visible transmittance, a ply (or a total of multiple plies) of VG10 would have to be 4 mm thick, and the thickness of GL20 would have to be even greater. Hence, these glass compositions would tend to result in significant weight increases over other conventional glasses (e.g., thermally toughened tinted glass with ceramic frit-coated edges) when employed in a vehicular sunroof-type application.

At first glance, a logical solution to the problem of insufficient optical absorbance is to focus on a conventional 'thick'-'thin' laminate and increase the dopant concentration in one or both glass plies. However, there are practical limitations to the quantity of conventional UV and NIR absorbing species that can be introduced into a glass without facing significant melting challenges. When a sufficiently large quantity (≥1.5 wt %) of an IR-absorbing species (e.g., $Fe^{2+}$) is introduced to a glass melted in a gas fired continuous melter (e.g., a float tank), the IR wavelengths are absorbed by the surface of the glass and very little heat penetrates to the tank bottom. This results in cold zones in the lower region of the melter. Conversely, in tanks that are predominately Joule heated with submerged electrodes (e.g., Corning's fusion tanks), the core of the furnace can become super-heated because the IR-absorbing glass is self-insulating. Irrespective of how the furnace is heated, radiation trapping of strongly IR-absorbing glass can prevent the glass from losing enough heat to reach forming temperature within the process footprint of most furnace designs. Thus, it is hard to get heat into IR absorbing glasses to melt them and also hard to get the heat back out to form them. To melt such a glass, significant modifications to the melter may be required to accommodate the melting and forming of such glasses. In summary, due to the limited dopant concentration, there is a finite range of optical path lengths for which a desired transmittance specification can be achieved with conventional tint glasses, and they currently are not absorptive enough to meet a panoramic sunroof tint spec in a 'thick-thin' laminate.

Other alternate technologies for light management that could enable a lightweight 'thick-thin' laminate, or other conventional glass substrates to meet the panoramic sunroof transmittance specifications, include solar-absorbing interlayers, NIR reflective coatings on glass, and NIR reflective laminate films. However, these alternate coating, film and layer technologies have some key limitations, including added cost, processing and certain design limitations, that have prevented these technologies from being widely adopted by automotive glazing makers. For example, solar-absorbing interlayers are generally comprised of a thermoplastic polymeric sheet (e.g., polyvinyl butyral (PVB)) that is doped with particles of NIR-absorbing species, such as lanthanum hexaboride ($LaB_6$) indium tin oxide (ITO), antimony tin oxide (ATO), organic dyes, and or pigments. Such coated laminates can also be multilayer structures having at least one polymeric interlayer wherein the dopants are dispersed in or coated on the interlayer. Nevertheless, these approaches result in significantly higher cost to the laminate and require additional processing, i.e., the development of the light-absorbing films, that add manufacturing complexity and can reduce yield.

As another example, reflective coatings, commonly referred to as low-emissivity (low-E) coatings, have also been successfully employed from a technical standpoint in laminates for sunroof-type applications. Low-E coatings minimize the amount of ultraviolet and infrared light that can pass through glass, without compromising the amount of visible light that is transmitted. For use as sunroof glazing, the coating must be modified to reflect visible wavelengths and or be used in combination with a tinted interlayer (e.g., dyed PVB). There are currently two basic processes for making low-E coatings—sputtered and pyrolytic. Sputtered coatings are multilayered coatings that are typically comprised of metals (commonly silver), metal oxides, and metal nitrides. Because silver is an inherently soft material and susceptible to corrosion, the coating must be surrounded by other materials (barrier layers) to prevent exposure to ambient air. A typical pyrolytic coating, on the other hand, is a metallic oxide, most commonly tin oxide with some additives, bonded to the glass while it is in a semi-molten state. The result is a 'baked-on' surface layer that is quite hard and durable.

While low-E reflective coatings, such as sputtered and pyrolytic coatings, have been widely used in window architecture for decades, automotive glazing manufacturers have been slow to adopt this technology due to its added material and manufacturing-related costs. These reflective coatings also pose several technical limitations when deployed in automotive glazing. Tinted, low-E reflective coatings require moisture protection and, therefore, necessitate careful sealing of the edges of a laminate employing them. Further, they impart visible color in reflection and not the desired neutral grey color. Additionally, it is more costly to coat a curved part with a low-E coating, such as a vehicular sunroof or comparable element, as compared to a planar glass substrate, such as employed in architectural windows. Sag-bend compatible low-E coatings have been developed, where a flat sheet of glass is coated and then sagged to shape. However, these coatings can be sagged over a limited sag bend radius and are susceptible to oxidation during the sag bending process. Also significantly, low-E reflective coatings block radio frequencies (RF). For example, PPG Industries markets an RF security glass with two silver layers that can block up to 54 dBs at RF frequencies. For a vehicle with a metal body and large windows, RF absorptive glazing poses a significant problem, especially as with the increasing number of wireless devices and sensors that are being integrated within modern vehicles. Still further, workarounds to overcome the RF absorption of low-E coatings add cost and process complexity, e.g., additional RF receivers and antennae.

Accordingly, there is a need for low cost and low weight substrate configurations and compositions (including methods of making them) with optical properties that are suitable for various window glazing and optical filter applications, including vehicular glazing applications.

SUMMARY OF THE DISCLOSURE

According to some aspects of the present disclosure, a glass-ceramic is provided that includes: 40 mol %≤$SiO_2$≤80 mol %; 1 mol %≤$Al_2O_3$≤15 mol %; 3 mol %≤$B_2O_3$≤50 mol %; 0 mol %≤$R_2O$≤15 mol %, $R_2O$ is one or more of $Li_2O$, $Na_2O$, $K_2O$, $Rb_2O$ and $Cs_2O$; 0 mol %≤RO≤2 mol %, RO is one or more of MgO, CaO, SrO and BaO; 0 mol %≤$P_2O_5$≤3 mol %; 0 mol %≤$SnO_2$≤0.5 mol %; 0.1 mol %≤$MoO_3$≤15 mol %; and 0 mol %≤$WO_3$≤10 mol %, wherein the $WO_3$ (mol %) plus the $MoO_3$ (mol %) is from 1 mol % to 19 mol %, and wherein $R_2O$ (mol %) minus the $Al_2O_3$ (mol %) is from −12 mol % to 4 mol %.

According to some additional aspects of the present disclosure, a glass-ceramic is provided that includes: 40 mol %≤$SiO_2$≤80 mol %; 1 mol %≤$Al_2O_3$≤15 mol %; 3 mol %≤$B_2O_3$≤50 mol %; 0 mol %≤$R_2O$≤15 mol %, $R_2O$ is one or more of $Li_2O$, $Na_2O$, $K_2O$, $Rb_2O$ and $Cs_2O$; 0 mol %≤RO≤2 mol %, RO is one or more of MgO, CaO, SrO and BaO; 0 mol %≤$P_2O_5$≤3 mol %; 0 mol %≤$SnO_2$≤0.5 mol %; 0.01 mol %≤$V_2O_5$≤0.2 mol %; 0 mol %≤$MoO_3$≤15 mol %; and 0.1 mol %≤$WO_3$≤10 mol %, wherein the $WO_3$ (mol %) plus the $MoO_3$ (mol %) is from 1 mol % to 19 mol %, and wherein $R_2O$ (mol %) minus the $Al_2O_3$ (mol %) is from −12 mol % to 4 mol %.

In some implementations, the glass-ceramic comprises a thickness from about 0.05 mm to about 0.5 mm and a total transmittance from about 4% to about 30% in the visible spectrum from 400 nm to 700 nm; from about 5% to about 15% in the near infrared (NIR) spectrum from 700 nm to 1500 nm; and/or less than or equal to 1% at ultraviolet (UV) wavelengths below 370 nm and less than or equal to 5% at UV wavelengths between 370 nm and 390 nm. Further, the glass-ceramic can comprise a thickness from about 0.05 mm to about 0.5 mm and a total transmittance from about 4% to about 10% in the visible spectrum from 400 nm to 700 nm.

In further implementations, the glass-ceramic can comprise an absorbance from 3.3 optical density units (OD)/mm to 24.0 OD/mm in ultraviolet (UV) wavelengths from 280 nm to 380 nm, an absorbance from 0.1 OD/mm to 12.0 OD/mm in visible wavelengths from 400 nm to 700 nm, an absorbance from 0.05 OD/mm to 10.4 OD/mm in near infrared (NIR) wavelengths from 700 nm to 2000 nm, and 0.05 OD/mm to 10.1 OD/mm in NIR wavelengths from 800 nm to 2500 nm.

In another implementation, the glass-ceramic further comprises 3 mol %≤$MoO_3$≤10 mol %, and 0 mol %≤$WO_3$≤trace amounts. Such a glass-ceramic can also comprise an absorbance from 3.3 optical density units (OD)/mm to 24.0 OD/mm in ultraviolet (UV) wavelengths from 280 nm to 380 nm, an absorbance from 0.1 OD/mm to 12.0 OD/mm in visible wavelengths from 400 nm to 700 nm, an absorbance from 0.05 OD/mm to 10.4 OD/mm in near infrared (NIR) wavelengths from 700 nm to 2000 nm, and 0.05 OD/mm to 10.1 OD/mm in NIR wavelengths from 800 nm to 2500 nm.

According to another implementation, the glass-ceramic further comprises 0.1 mol %≤$WO_3$≤4 mol %. Such a glass-ceramic can also comprise an absorbance from 3.3 optical density units (OD)/mm to 7.2 OD/mm in ultraviolet (UV) wavelengths from 280 nm to 380 nm, an absorbance from 0.1 OD/mm to 5.0 OD/mm in visible wavelengths from 400 nm to 700 nm, an absorbance from 0.05 OD/mm to 9.6 OD/mm in near infrared (NIR) wavelengths from 700 nm to 2000 nm, and 0.05 OD/mm to 7.5 OD/mm in NIR wavelengths from 800 nm to 2500 nm.

According to some aspects of the present disclosure, a glass-ceramic is provided that includes: 40 mol %≤$SiO_2$≤80 mol %; 1 mol %≤$Al_2O_3$≤15 mol %; 3 mol %≤$B_2O_3$≤50 mol %; 0 mol %≤$R_2O$≤15 mol %, $R_2O$ is one or more of $Li_2O$, $Na_2O$, $K_2O$, $Rb_2O$ and $Cs_2O$; 0 mol %≤RO≤2 mol %, RO is one or more of MgO, CaO, SrO and BaO; 0 mol %≤$P_2O_5$≤3 mol %; 0 mol %≤$SnO_2$≤0.5 mol %; 0.1 mol %≤MoO$_3$≤15 mol %; and 0 mol %≤WO$_3$≤10 mol %, wherein the WO$_3$ (mol %) plus the MoO$_3$ (mol %) is from 1 mol % to 19 mol %, wherein R$_2$O (mol %) minus the Al$_2$O$_3$ (mol %) is from −12 mol % to 4 mol %, and further wherein the glass-ceramic comprises a glassy phase and at least one crystalline phase selected from the group consisting of a stoichiometric crystalline phase, a non-stoichiometric crystalline phase and a mixed stoichiometric and non-stoichiometric crystalline phase. The glass-ceramic can further comprise 3 mol %≤MoO$_3$≤10 mol %, and 0 mol %≤WO$_3$≤trace amounts.

In some implementations of one of the foregoing glass-ceramics, the at least one crystalline phase comprises a crystalline phase of M$_x$WO$_3$ and/or M$_y$MoO$_3$, wherein M is at least one of H, Li, Na, K, Rb, Cs, Mg, Ca, Sr, Sn, P, S, Ti, V, Cr, Mn, Fe, Co, Ni, Cu, Ga, Se, Zr, Nb, Ru, Rh, Pd, Ag, Cd, In, Sb, Te, La, Ce, Pr, Nd, Sm, Eu, Gd, Tb, Dy, Ho, Er, Tm, Yb, Lu, Ta, Os, Ir, Pt, Au, Tl, Pb, Bi, and/or U, and wherein 0≤x≤1 and 0≤y≤1. Further, the glass-ceramic can comprise ternary metal oxides of the general formula M'$_x$M''$_y$O$_z$, where M'' is a transition metal or a combination of transition metals, M' is a metal or a combination of metals that differ from M'', 2≤z≤5, and x and y are based on z and the valence of M' and M''.

According to a further aspect of the present disclosure, a window is provided that comprises: a substrate having a thickness from about 0.1 mm to about 3 mm, the substrate further comprising: (a) a total transmittance from about 4% to about 30% in the visible spectrum from 400 nm to 700 nm; (b) a total transmittance of less than or equal to 1% at ultraviolet (UV) wavelengths below 370 nm and less than or equal to 5% at UV wavelengths between 370 nm and 390 nm; (c) a total transmittance from about 5% to about 15% in the near infrared (NIR) spectrum from 700 nm to 1500 nm; and (d) a glass-ceramic composition, wherein the glass-ceramic composition comprises: 40 mol %≤SiO$_2$≤80 mol %; 1 mol %≤Al$_2$O$_3$≤15 mol %; 3 mol %≤B$_2$O$_3$≤50 mol %; 0 mol %≤R$_2$O≤15 mol %, R$_2$O is one or more of Li$_2$O, Na$_2$O, K$_2$O, Rb$_2$O and Cs$_2$O; 0 mol %≤RO≤2 mol %, RO is one or more of MgO, CaO, SrO and BaO; 0 mol %≤P$_2$O$_5$≤3 mol %; 0 mol %≤SnO$_2$≤0.5 mol %; 0.1 mol %≤MoO$_3$≤15 mol %; and 0 mol %≤WO$_3$≤10 mol %, wherein the WO$_3$ (mol %) plus the MoO$_3$ (mol %) is from 1 mol % to 19 mol %, and wherein R$_2$O (mol %) minus the Al$_2$O$_3$ (mol %) is from −12 mol % to 4 mol %.

In some implementations, the foregoing window can be configured for a vehicular roof. Further, the substrate of the foregoing window can have a thickness from about 0.1 mm to about 0.5 mm. The substrate can further comprise a total transmittance between about 4% and about 10% in the visible spectrum from 400 nm to 700 nm.

According to a further aspect of the disclosure, a method of making a glass-ceramic is provided that includes mixing a batch comprising 40 mol %≤SiO$_2$≤80 mol %; 1 mol %≤Al$_2$O$_3$≤15 mol %; 3 mol %≤B$_2$O$_3$≤50 mol %; 0 mol %≤R$_2$O≤15 mol %, R$_2$O is one or more of Li$_2$O, Na$_2$O, K$_2$O, Rb$_2$O and Cs$_2$O; 0 mol %≤RO≤2 mol %, RO is one or more of MgO, CaO, SrO and BaO; 0 mol %≤P$_2$O$_5$≤3 mol %; 0 mol %≤SnO$_2$≤0.5 mol %; 0.1 mol %≤MoO$_3$≤15 mol %; and 0 mol %≤WO$_3$≤10 mol %, wherein the WO$_3$ (mol %) plus the MoO$_3$ (mol %) is from 1 mol % to 19 mol %, and wherein R$_2$O (mol %) minus the Al$_2$O$_3$ (mol %) is from −12 mol % to 4 mol %. The method also includes: melting the batch between about 1500° C. and about 1700° C. to form a melt; annealing the melt between about 500° C. and about 600° C. to define an annealed melt; and heat treating the annealed melt between about 500° C. and about 1000° C. from about 5 minutes to about 48 hours to form the glass-ceramic.

In some implementations of the foregoing method of making a glass-ceramic, the heat treating comprises heat treating the annealed melt between about 500° C. and about 800° C. from about 5 minutes to about 24 hours to form the glass-ceramic. Further, the method can include the following additional steps: reducing the melt to a plurality of particles; re-mixing the melt comprising a plurality of particles into a second batch; re-melting the second batch between about 1500° C. and about 1700° C. to form a second melt. The reducing, re-mixing and re-melting steps are conducted after the step of melting the batch and before the step of annealing the melt. Further, the melt in the step of annealing is the second melt.

According to another aspect of the disclosure, a method of making a patterned glass-ceramic article is provided that includes providing a substrate having a glass-ceramic composition comprising: 40 mol %≤SiO$_2$≤80 mol %; 1 mol %≤Al$_2$O$_3$≤15 mol %; 3 mol %≤B$_2$O$_3$≤50 mol %; 0 mol %≤R$_2$O≤15 mol %, R$_2$O is one or more of Li$_2$O, Na$_2$O, K$_2$O, Rb$_2$O and Cs$_2$O; 0 mol %≤RO≤2 mol %, RO is one or more of MgO, CaO, SrO and BaO; 0 mol %≤P$_2$O$_5$≤3 mol %; 0 mol %≤SnO$_2$≤0.5 mol %; 0.1 mol %≤MoO$_3$≤15 mol %; and 0 mol %≤WO$_3$≤1 mol %, wherein the WO$_3$ (mol %) plus the MoO$_3$ (mol %) is from 1 mol % to 19 mol %, wherein R$_2$O (mol %) minus the Al$_2$O$_3$ (mol %) is from −12 mol % to 4 mol %, and further wherein the glass-ceramic comprises a glassy phase and at least one crystalline phase selected from the group consisting of a stoichiometric crystalline phase, a non-stoichiometric crystalline phase and a mixed stoichiometric and non-stoichiometric crystalline phase. The method also includes heating a portion of the substrate to a temperature of 600° C. or greater to form a bleached portion and a non-bleached portion, wherein the bleached portion comprises a glassy phase, the glassy phase in the bleached portion at a greater concentration than the glassy phase in the non-bleached portion.

In some implementations of the foregoing method of making a patterned glass-ceramic article, the heating step is conducted with a laser source. Further, in some aspects, the bleached portion comprises an absorption that differs no more than 10% from an absorption of the non-bleached portion. In other aspects, the bleached portion comprises an absorption that differs by at least 10% from an absorption of the non-bleached portion. In another implementation, the method can further include a step of preheating the substrate from about 400° C. to about 550° C. prior to the heating step.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the disclosure and the appended claims.

The accompanying drawings are included to provide a further understanding of principles of the disclosure, and are incorporated in, and constitute a part of, this specification. The drawings illustrate one or more embodiment(s) and, together with the description, serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following embodiments.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Figure 1:
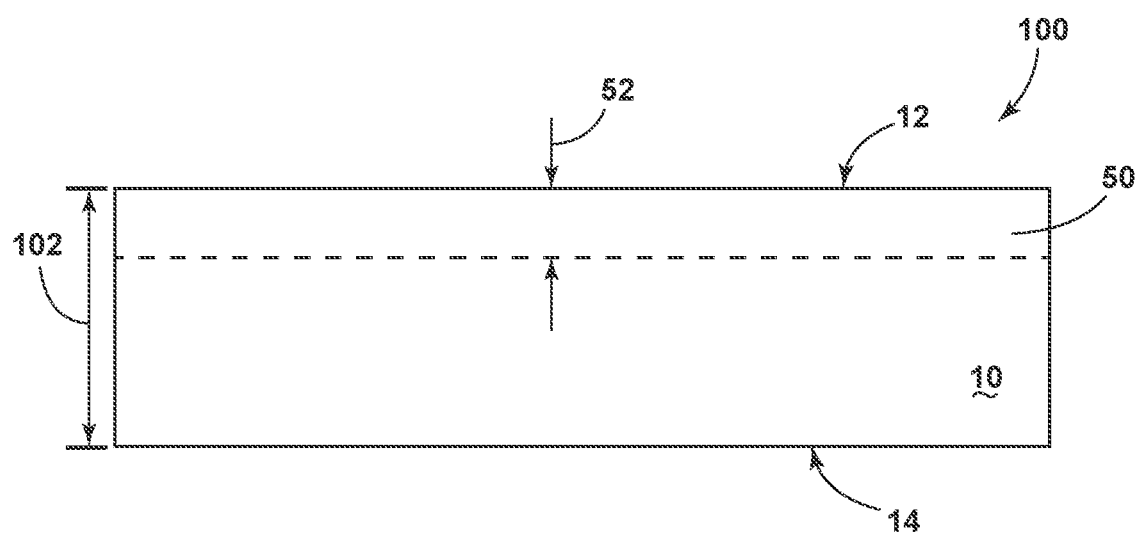
FIG. 1 is a cross-sectional view of an article including a substrate comprising a glass-ceramic composition, according to at least one example of the disclosure.

Additional features and advantages will be set forth in the detailed description which follows and will be apparent to those skilled in the art from the description, or recognized by practicing the embodiments as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Directional terms as used herein—for example up, down, right, left, front, back, top, bottom—are made only with reference to the figures as drawn and are not intended to imply absolute orientation.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

As also used herein, the terms "glass article," "glass articles," "glass-ceramic article" and "glass-ceramic articles" are used in their broadest sense to include any object made wholly or partly of glass and/or glass-ceramics.

Unless otherwise specified, all compositions are expressed in terms of mole percent (mol %). Coefficients of thermal expansion (CTE) are expressed in terms of $10^{-7}/°$ C. and represent a value measured over a temperature range from about 20° C. to about 300° C., unless otherwise specified.

As used herein, "transmission", "transmittance", "optical transmittance" and "total transmittance" are used interchangeably in the disclosure and refer to external transmission or transmittance, which takes absorption, scattering and reflection into consideration. Fresnel reflection is not factored out of the transmission and transmittance values reported herein. In addition, any total transmittance values referenced over a particular wavelength range are given as an average of the total transmittance values measured over the specified wavelength range.

As used herein, "a glassy phase" refers to an inorganic material within the glass and glass-ceramic articles of the disclosure that is a product of fusion that has cooled to a rigid condition without crystallizing.

As used herein, "a crystalline phase" refers to an inorganic material within the glass and glass-ceramic articles of the disclosure that is a solid composed of atoms, ions or molecules arranged in a pattern that is periodic in three dimensions. Further, "a crystalline phase" as referenced in this disclosure, unless expressly noted otherwise, is determined to be present using the following method. First, powder x-ray diffraction ("XRD") is employed to detect the presence of crystalline precipitates. Second, Raman spectroscopy ("Raman") is employed to detect the presence of crystalline precipitates in the event that XRD is unsuccessful (e.g., due to size, quantity and/or chemistry of the precipitates). Optionally, transmission electron microscopy ("TEM") is employed to visually confirm or otherwise substantiate the determination of crystalline precipitates obtained through the XRD and/or Raman techniques.

As used herein, "optical density units", "OD" and "OD units" are used interchangeably in the disclosure to refer to optical density units, as commonly understood as a measure of absorbance of the material tested, as measured with a spectrometer. Further, the terms "OD/mm" or "OD/cm" used in this disclosure are normalized measures of absorbance, as determined by dividing the optical density units (i.e., as measured by an optical spectrometer) by the thickness of the sample (e.g., in units of millimeters or centimeters). In addition, any optical density units referenced over a particular wavelength range (e.g., 3.3 OD/mm to 24.0 OD/mm in UV wavelengths from 280 nm to 380 nm) are given as an average value of the optical density units over the specified wavelength range.

As it relates to the glass-ceramic and glass-ceramic materials and articles of the disclosure, compressive stress and depth of compression ("DOC") are measured by evaluating surface stress using commercially available instruments, such as the FSM-6000, manufactured by Orihara Co., Lt. (Tokyo, Japan), unless otherwise noted herein. Surface stress measurements rely upon the accurate measurement of the stress optical coefficient ("SOC"), which is related to the birefringence of the glass. SOC in turn is measured according to a modified version of Procedure C, which is described in ASTM standard C770-98 (2013) ("modified Procedure C"), entitled "Standard Test Method for Measurement of Glass Stress-Optical Coefficient," the contents of which is incorporated herein by reference in its entirety. The modified Procedure C includes using a glass or glass-ceramic disc as the specimen having a thickness of 5 to 10 mm and a diameter of 12.7 mm. The disc is isotropic and homogeneous, and is core-drilled with both faces polished and parallel. The modified Procedure C also includes calculating the maximum force, $F_{max}$, to be applied to the disc. The force should be sufficient to produce at least 20 MPa compression stress. $F_{max}$ is calculated using the equation:

$$F_{max}=7.854*D*h$$

where $F_{max}$ is the maximum force (N), D is the diameter of the disc (mm), and h is the thickness of the light path (mm). For each force applied, the stress is computed using the equation:

$$\sigma(MPa)=8F/(\pi*D*h)$$

where F is the force (N), D is the diameter of the disc (mm), and h is the thickness of the light path (mm).

As detailed in this disclosure, glass-ceramic materials and articles with UV- and NIR-blocking attributes, and more particularly, articles and patterned articles that comprise mixed molybdenum-tungsten oxide-doped, molybdenum oxide-doped and tungsten/vanadium oxide-doped alumino-borosilicate compositions are detailed. The disclosure also relates to methods of making these materials and articles. These glass-ceramic compositions, materials and articles offer a reduced-cost, performance-enhanced and/or aesthetically-enhanced alternative to oxide-doped alumino-borosilicate compositions with higher tungsten oxide levels (collectively, "comparative tungsten bronze glass-ceramics"). The glass-ceramics of the disclosure are also capable of providing high solar shielding for various window applications, including the most stringent vehicular sunroof glazing requirements (i.e., at least 4% visible transmittance), in the form of substrates having a thickness of less than or equal to 0.5 mm, without resort to any additional interlayers, reflective coatings, laminated layers, etc. Further, these glass-ceramics can be fully or partially bleached with a heat source to form, for example, patterned glass-ceramic articles, e.g., for use in various window applications. In addition, molybdenum oxide-doped embodiments of these glass-ceramics are disclosed that exhibit very high optical absorbance, which makes them suitable for additional optical applications, including ultra-thin path-length optical filters, as an additive for laminate glazing interlayers and other applications.

More generally, the glass-ceramic materials (and the articles containing them) disclosed herein comprise a balance of an alumino-boro-silicate glass, a molybdenum oxide, an optional tungsten oxide, an optional alkali metal oxide and an optional alkaline earth metal oxide. Aspects of these glass-ceramic materials (and the articles containing them) can also comprise a balance of an alumino-boro-silicate glass, a tungsten oxide, a vanadium oxide, an optional alkali metal oxide and an optional alkaline earth metal oxide. In general, the glass-ceramic materials of the disclosure can be characterized by low visible transmittance and strong UV & NIR absorption (see, e.g., Ex. 1 and Ex. 2 in FIGS. 3A and 3B, and their corresponding description). At a thickness of 0.5 mm, the transmittance of these glass-ceramic materials can range from about 4% (or even lower) to about 30% in the visible spectrum (400 nm to 700 nm) and about 5% to 15% in the NIR spectrum (700 nm to 1500 nm). These glass-ceramics can also exhibit transmittance of less than or equal to 1% and less than or equal to 5% at UV wavelengths below 370 nm and from 370 nm to 390 nm, respectively, at a thickness of 0.5 mm. As such, they are capable of meeting vehicular panoramic sunroof glazing requirements without coatings or other absorptive layers at a thickness that is less than 8× the thickness of substrates fabricated from conventional tinted glass compositions, such as VG10 and GL20 (compare Exs. 1 & 2 to Comp. Exs. 1 & 2 in FIGS. 3A & 3B, and their corresponding description). Still further, the IR- and UV-blocking compositions of the disclosure, as configured in the form of a low thickness, dual-clad (~50 to 200 microns in total thickness) over an optically transparent, core glass with a higher coefficient of thermal expansion (CTE), are capable of appreciable visible transmittance and IR/UV-blocking levels that are comparable to significantly thicker, conventional windshield glasses (e.g., 2.13 mm thick substrates fabricated from PPG Industries, Inc. Solargreen C5 and C3.9 glass).

The crystalline phase that imparts the strong NIR absorption in the glass-ceramics of the disclosure is a non-stoichiometric molybdenum oxide, mixed molybdenum-tungsten oxide, vanadium-tungsten oxide and/or vanadium-molybdenum-tungsten oxide (also referred herein as a "bronze"). Further, the optical performance of the molybdenum oxide-containing, mixed molybdenum and tungsten oxide-containing, and mixed vanadium and tungsten oxide-containing glass ceramics of the disclosure is comparable to that of the tungsten bronze glass-ceramics. At 0.5 mm thickness, these glass ceramics are capable of absorbing 91.7% of the solar spectrum, compared to the tungsten bronze glass ceramic, which can absorb 96%. A key advantage of the molybdenum oxide-containing, and mixed molybdenum and tungsten oxide-containing, glass ceramics of the disclosure is that these glass-ceramics are lower in cost than the comparative tungsten bronze glass-ceramics. For example, implementations of the glass-ceramics of the disclosure can employ no tungsten oxide or lower amounts of tungsten oxide than the comparative tungsten bronze glass-ceramics, with tungsten oxide being significantly higher in cost than molybdenum oxide. Further, the mixed vanadium and tungsten oxide-containing glass-ceramics are advantageous because they produce a neutral grey hue that is preferred by automotive manufacturers. In contrast, pure-tungsten-containing glass ceramics do not produce a neutral grey hue, instead they typically exhibit blue, green, bronze and/or brown hues.

Various embodiments of the glass-ceramic materials of the disclosure can be employed in the form of substrates, elements, covers and other elements in any of the following applications: windows and similar elements employed in vehicles, architecture, residences, and other structures; vehicular sunroofs, moonroofs, panoramic roofs, and other sunroof-like panels; and laser eye protection lenses. Embodiments of these glass-ceramic materials are also suitable for use in various artistic endeavors and applications that make use of colored glass, glass-ceramics and ceramics, such as glassblowers, flameworkers, stained glass artists, etc.

Further, molybdenum-containing glass-ceramics of the disclosure are suitable in certain applications requiring extremely short path length filters (on the order of 100 microns). These glass-ceramics can be powdered and introduced as tinted UV and IR absorbing additives that can be employed in laminate glazing interlayer materials, such as polyvinyl butyral (PVB). Further, these molybdenum-containing glass-ceramics can be jet milled to a small size, functionalized and then, it is believed that they can be employed in photothermal susceptor agent therapies for treatment of cancer and other tumors in view of their strong and broad NIR absorption.

According to some implementations of the glass-ceramics of the disclosure, pure molybdenum oxide-containing glass ceramics (i.e., that lack intentional additions of tungsten oxide) exhibit extremely high optical absorbance (on the order of 130-140 $cm^{-1}$ in the NIR) that is variable with heat treatment time and temperature. These compositions are capable of serving as an excellent UV and NIR blocking tint glass at extremely short path lengths. At 100 microns, these glass ceramics are capable of exhibiting an average transmittance of 17% in the visible (400-700 nm) and 6% in the NIR (700-1500 nm). Thus, these 'pure' molybdenum oxide-containing glass-ceramics can be used in certain applications requiring extremely short path length filters. They also can be powdered and introduced as a tinted UV- and IR-absorbing additive in laminate glazing interlayer materials, such as polyvinyl butyral (PVB).

The glass-ceramic materials, and the articles containing them, offer various advantages over conventional glass, glass-ceramic and ceramic materials in the same field, including the VG10 and GL20 glass compositions. As noted earlier, the glass-ceramic materials of the disclosure can meet glazing specifications (e.g., with 4 to 10% visible transmittance) at thicknesses of 0.5 mm, which is 8× thinner than what would be required using conventional glass compositions, such as VG10 and GL20. Further, at a 0.5 mm thickness, the mixed tungsten/molybdenum-containing, molybdenum-containing, and mixed tungsten/vanadium-containing glass-ceramics of the disclosure are capable of absorbance levels that are comparable to those of the comparative tungsten bronze glass-ceramics, and are significantly lower in cost. In addition, the glass-ceramics of the disclosure can be produced through conventional melt quench processing techniques and can be chemically strengthened (e.g., through ion exchange processes). The glass-ceramics of the disclosure can also be patterned and bleached through the application of thermal energy, e.g., any of a variety of laser sources operating from 500 nm to about 1700 nm. Still further, the optical absorption characteristics of the glass-ceramics of the disclosure can be tuned through heat treatment time and temperature. Finally, certain of the molybdenum-containing glass-ceramics of the disclosure exhibit significantly higher of UV, VIS and NIR absorbance than most known materials.

Referring now to FIG. 1, an article 100 is depicted that includes a substrate 10 with a thickness 102 and comprising a glass-ceramic composition, according to the disclosure. These articles can be employed in any of the applications outlined earlier (e.g., vehicular sunroofs, moonroofs, panoramic roofs, windows, and other sunroof-like panels, etc.). Accordingly, the substrate 10 can, in some implementations, have a thickness 102 that ranges from about 0.05 mm to about 5 mm. In some embodiments, the substrate 10 has a thickness 102 that ranges from 0.05 mm to about 5 mm, from about 0.05 mm to about 4 mm, from about 0.05 mm to about 3 mm, from about 0.05 mm to about 2 mm, from about 0.05 mm to about 1 mm, from about 0.05 mm to about 0.5 mm, from about 0.05 mm to about 0.25 mm, from about 0.05 mm to about 0.2 mm, from about 0.1 mm to about 5 mm, from about 0.1 mm to about 4 mm, from about 0.1 mm to about 3 mm, from about 0.1 mm to about 2 mm, from about 0.1 mm to about 1 mm, from about 0.1 mm to about 0.5 mm, from about 0.1 mm to about 0.25 mm, and all thickness values between these thickness range endpoints. Further, in embodiments of the article 100 depicted in FIG. 1, the substrate 10 may have a selected length and width, or diameter, to define its surface area. The substrate 10 may have at least one edge between the primary surfaces 12, 14 of the substrate 10 defined by its length and width, or diameter.

Accordingly, the substrate 10 depicted in FIG. 1 can, in some embodiments, comprise a thickness 102 that ranges from about 0.05 mm to about 0.5 mm and a total transmittance from about 4% to about 30% in the visible spectrum from 400 nm to 700 nm. Further, in some implementations, the total transmittance can vary from about 4% to about 30%, from about 4% to about 25%, from about 4% to about 20%, from about 4% to about 15%, from about 4% to about 10%, and all values between these transmittance levels, in the visible spectrum from 400 nm to 700 nm. The substrate 10 can also comprise a thickness 102 that ranges from about 0.05 mm to about 0.5 mm and a total transmittance from about 5% to about 15% in the near infrared (NIR) spectrum from 700 nm to 1500 nm. In some implementations, the total transmittance can vary from about 2% to about 20%, from about 2% to about 15%, from about 2% to about 10%, from about 5% to about 15%, from about 5% to about 12.5%, from about 5% to about 10%, from about 5% to about 7.5%, and all values between these transmittance levels, in the NIR spectrum. In addition, the substrate 10 can comprise a thickness 102 that ranges from about 0.05 mm to about 0.5 mm and a total transmittance of less than or equal to 1% at ultraviolet wavelengths (UV) below 370 nm and less than or equal to 5% at UV wavelengths between 370 nm and 390 nm. In implementations, the total transmittance can be less than or equal to 1%, less than or equal to 0.9%, less than or equal to 0.8%, less than or equal to 0.7%, less than or equal to 0.6%, less than or equal to 0.5%, and all other values within these ranges, at UV wavelengths below 370 nm. Further, the total transmittance can be less than or equal to 5%, less than or equal to 4%, less than or equal to 3%, less than or equal to 2%, less than or equal to 1%, and all other values within these ranges, at UV wavelengths between 370 nm and 390 nm.

The optical transmission properties of the article 100 depicted in FIG. 1, and particularly its glass-ceramic compositions, can also be defined independent of the thickness 102 of the substrate 10. According to some embodiments of the article 100, its glass-ceramic composition can comprise an absorbance from 3.3 optical density units (OD)/mm to 24.0 OD/mm in ultraviolet (UV) wavelengths from 280 nm to 380 nm. In embodiments, the glass-ceramic composition can comprise an absorbance from about 3 OD/mm to 25.0 OD/mm, from about 3 OD/mm to 22.5 OD/mm, from about 3 OD/mm to 20.0 OD/mm, from about 3 OD/mm to 17.5 mm, from about 3 OD/mm to 15.0 OD/mm, from about 3 OD/mm to 12.5 OD/mm, from about 3 OD/mm to 10.0 OD/mm, from about 3 OD/mm to 7.5 OD/mm, from about 3 OD/mm to 5.0 OD/mm, and all values between these ranges, in UV wavelengths from 280 nm to 380 nm.

According to further embodiments of the article 100, its glass-ceramic composition can comprise an absorbance from 0.1 OD/mm to 12 OD/mm in the visible wavelengths from 400 nm to 700 nm. In embodiments, the glass-ceramic composition can comprise an absorbance from 0.05 OD/mm to 12.0 OD/mm, from 0.05 OD/mm to 11.0 OD/mm, from 0.05 OD/mm to 10.0 OD/mm, from 0.05 OD/mm to 9.5 OD/mm, from 0.05 OD/mm to 9.0 OD/mm, from 0.05 OD/mm to 8.5 OD/mm, from 0.05 OD/mm to 8.0 OD/mm, from 0.05 OD/mm to 7.5 OD/mm, from 0.05 OD/mm to 7.0 OD/mm, from 0.05 OD/mm to 6.5 OD/mm, from 0.05 OD/mm to 6.0 OD/mm, from 0.05 OD/mm to 5.5 OD/mm, from 0.05 OD/mm to 5.0 OD/mm, from 0.05 OD/mm to 4.5 OD/mm, from 0.05 OD/mm to 4.0 OD/mm, and all values between these ranges, in visible wavelengths from 400 nm to 700 nm.

In further embodiments of the article 100, the glass-ceramic composition can comprise an absorbance from 0.05 OD/mm to 10.4 OD/mm in the near infrared (NIR) wavelengths from 700 nm to 2000 nm. In embodiments, the glass-ceramic composition can comprise an absorbance from 0.05 OD/mm to 13.0 OD/mm, from 0.05 OD/mm to 12.5 OD/mm, from 0.05 OD/mm to 12.0 OD/mm, from 0.05 OD/mm to 11.5 OD/mm, from 0.05 OD/mm to 11.0 OD/mm, from 0.05 OD/mm to 10.5 OD/mm, from 0.05 OD/mm to 10.0 OD/mm, from 0.05 OD/mm to 9.5 OD/mm, from 0.05 OD/mm to 9.0 OD/mm, from 0.05 OD/mm to 8.5 OD/mm, from 0.05 OD/mm to 8.0 OD/mm, and all values between these ranges, in the NIR wavelengths from 700 nm to 2000 nm. In additional embodiments of the article 100, the glass-ceramic composition can comprise an absorbance from 0.05 OD/mm to 10.1 OD/mm in the near infrared (NIR) wavelengths from 800 nm to 2500 nm. In embodiments, the glass-ceramic composition can comprise an absorbance from 0.05 OD/mm to 13.0 OD/mm, from 0.05 OD/mm to 12.5 OD/mm, from 0.05 OD/mm to 12.0 OD/mm, from 0.05 OD/mm to 11.5 OD/mm, from 0.05 OD/mm to 11.0 OD/mm, from 0.05 OD/mm to 10.5 OD/mm, from 0.05 OD/mm to 10.0 OD/mm, from 0.05 OD/mm to 9.5 OD/mm, from 0.05 OD/mm to 9.0 OD/mm, from 0.05 OD/mm to 8.5 OD/mm, from 0.05 OD/mm to 8.0 OD/mm, from 0.05 OD/mm to 7.5 OD/mm, from 0.05 OD/mm to 7.0 OD/mm, from 0.05 OD/mm to 6.5 OD/mm, from 0.05 OD/mm to 6.0 OD/mm, and all values between these ranges, in the NIR wavelengths from 850 nm to 2500 nm.

Referring again to FIG. 1, the substrate 10 comprises a pair of opposing primary surfaces 12, 14. In some embodiments of the article 100, the substrate 10 comprises a compressive stress region 50. As shown in FIG. 1, the compressive stress region 50 extends from the primary surface 12 to a first selected depth 52 in the substrate. Nevertheless, some embodiments (not shown) include a comparable compressive stress region 50 that extends from the primary surface 14 to a second selected depth (not shown). Further, some embodiments (not shown) include multiple compressive stress regions 50 extending from the primary surfaces 12, 14 and/or edges of the substrate 10.

As used herein, a "selected depth," (e.g., selected depth 52) "depth of compression" and "DOC" are used interchangeably to define the depth at which the stress in a substrate 10, as described herein, changes from compressive to tensile. DOC may be measured by a surface stress meter, such as an FSM-6000, or a scattered light polariscope (SCALP) depending on the ion exchange treatment. Where the stress in a substrate 10 having a glass or a glass-ceramic composition is generated by exchanging potassium ions into the glass substrate, a surface stress meter is used to measure DOC. Where the stress is generated by exchanging sodium ions into the glass article, SCALP is used to measure DOC. Where the stress in the substrate 10 having a glass or glass-ceramic composition is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass substrates is measured by a surface stress meter. As also used herein, the "maximum compressive stress" is defined as the maximum compressive stress within the compressive stress region 50 in the substrate 10. In some embodiments, the maximum compressive stress is obtained at or in close proximity to the one or more primary surfaces 12, 14 defining the compressive stress region 50. In other embodiments, the maximum compressive stress is obtained between the one or more primary surfaces 12, 14 and the selected depth 52 of the compressive stress region 50.

In some embodiments of the article 100, as depicted in exemplary form in FIG. 1, the substrate 10 is selected from a chemically strengthened alumino-boro-silicate glass. For example, the substrate 10 can be selected from chemically strengthened alumino-boro-silicate glass having a compressive stress region 50 extending to a first selected depth 52 of greater than 10 μm, with a maximum compressive stress of greater than 150 MPa. In further embodiments, the substrate 10 is selected from a chemically strengthened alumino-boro-silicate glass having a compressive stress region 50 extending to a first selected depth 52 of greater than 25 μm, with a maximum compressive stress of greater than 400 MPa. The substrate 10 of the article 100 may also include one or more compressive stress regions 50 that extend from one or more of the primary surfaces 12, 14 to a selected depth 52 (or depths) having a maximum compressive stress of greater than about 150 MPa, greater than 200 MPa, greater than 250 MPa, greater than 300 MPa, greater than 350 MPa, greater than 400 MPa, greater than 450 MPa, greater than 500 MPa, greater than 550 MPa, greater than 600 MPa, greater than 650 MPa, greater than 700 MPa, greater than 750 MPa, greater than 800 MPa, greater than 850 MPa, greater than 900 MPa, greater than 950 MPa, greater than 1000 MPa, and all maximum compressive stress levels between these values. In some embodiments, the maximum compressive stress is 2000 MPa or lower. In addition, the depth of compression (DOC) or first selected depth 52 can be set at 10 μm or greater, 15 μm or greater, 20 μm or greater, 25 μm or greater, 30 μm or greater, 35 μm or greater, and to even higher depths, depending on the thickness of the substrate 10 and the processing conditions associated with generating the compressive stress region 50. In some embodiments, the DOC is less than or equal to 0.3 times the thickness (t) of the substrate 10, for example 0.3 t, 0.28 t, 0.26 t, 0.25 t, 0.24 t, 0.23 t, 0.22 t, 0.21 t, 0.20 t, 0.19 t, 0.18 t, 0.15 t, or 0.1 t.

According to another embodiment, a laminate article of the disclosure can be configured for window applications requiring higher visible transmittance with IR- and UV-shielding. The laminate article comprises a pair of substrates 10 (see FIG. 1) that serve as a dual-clad configuration over a core glass layer. The thickness 102 of each substrate 10, as employed as a clad in a laminate article, is from about 0.025 mm to about 0.1 mm. Hence, the total thickness of the pair of substrates 10 in such a dual-clad configuration is from about 0.05 mm to about 0.2 mm. Further, the core glass layer (not shown) has a thickness of about 0.2 mm to about 0.8 mm and its composition is selected to have a higher coefficient of thermal expansion (CTE) than each of the substrates 10 that serve as a clad. As embodiments of the substrates 10 have a CTE in a broad range, from 33-65× $10^{-7}/°$ C. (see, e.g., Exs. 1-35 in Tables 1A-1C), various core glass compositions can be employed in this laminate configuration. In view of the CTE mismatch between the core and clad layers (i.e., substrates 10), processing of these laminates results in compressive residual stresses in the substrates 10; consequently, a compressive stress region 50 within each of these substrates 10 is optional, e.g., as developed through an ion-exchange process.

Referring again to the laminate article embodiment, suitable core glass layers must be optically transparent, preferably with a viscosity matched to the composition of the substrates 10. For example, the core glass layer can be fabricated from a silicate glass comprising: from about 70 mol % to about 80 mol % $SiO_2$; from about 0 mol % to about 8 mol % $Al_2O_3$; from about 3 mol % to about 10 mol % $B_2O_3$; from about 0 mol % to about 2 mol % $Na_2O$; from about 10 mol % to about 15 mol % $K_2O$; and from about 5 mol % to about 6 mol % of alkaline earth oxide, wherein the alkaline earth oxide is at least one of MgO, SrO, and BaO without containing CaO. It should also be understood that other glass compositions may also be used to form the core glass layer of the laminate article, provided that the average CTE of the core glass layer is greater than or equal to the average CTE of each of the substrates 10 serving as the clad. Embodiments of the resulting laminate are capable of providing strong UV- and IR-attenuation with low visible transmittance without the use of IR-shielding layers (e.g., coatings or films) at path lengths that are significantly shorter than conventional absorptive tinted glasses (e.g., VG10 and GL20). Other embodiments of the resulting laminate are capable of providing strong UV- and IR-attenuation with relatively high visible transmittance levels (e.g., 2.13 mm thick substrates fabricated from PPG Industries, Inc. Solargreen C5 and C3.9 glass). Further, embodiments of these laminates are transparent to RF signals, unlike substrates with conventional glazing compositions that employ IR-coatings to achieve IR shielding requirements. As such, these laminates are believed to be compatible with current RF frequencies and 5G wireless requirements.

Referring again to FIG. 1, the substrate 10 of the article 100 can be characterized by a glass-ceramic composition. In embodiments, the glass-ceramic composition of the substrate 10 is given by: $MoO_3$ from 0.1 mol % to about 15 mol %; $WO_3$ from 0 mol % to 10 mol %; optionally, at least one alkali metal oxide from 0 to 15 mol %; and a balance of a silicate-containing glass. In other embodiments, the glass-ceramic composition of the substrate 10 is given by: $MoO_3$ from 0 mol % to about 15 mol %; $WO_3$ from 0.1 mol % to 10 mol %; $V_2O_5$ from 0.01 mol % to 0.2 mol %; optionally, at least one alkali metal oxide from 0 to 15 mol %; and a balance of a silicate-containing glass. These silicate-containing glasses include alumino-boro-silicate glass, borosilicate glass, alumino-silicate glass, soda-lime glass, and chemically-strengthened versions of these silicate-containing glasses.

As outlined earlier, the glass-ceramic materials of the disclosure, including the substrate 10 employed in the article 100 (see FIG. 1), can be characterized by the following glass-ceramic composition: 40 mol %≤$SiO_2$≤80 mol %; 1 mol %≤$Al_2O_3$≤15 mol %; 3 mol %≤$B_2O_3$≤50 mol %; 0 mol %≤$R_2O$≤15 mol %, $R_2O$ is one or more of $Li_2O$, $Na_2O$, $K_2O$, $Rb_2O$ and $Cs_2O$; 0 mol %≤RO≤2 mol %, RO is one or more of MgO, CaO, SrO and BaO; 0 mol %≤$P_2O_5$≤3 mol %; 0 mol %≤$SnO_2$≤0.5 mol %; 0.1 mol %≤$MoO_3$≤15 mol %; and 0 mol %≤$WO_3$≤10 mol %, wherein the $WO_3$ (mol %) plus the $MoO_3$ (mol %) is from 1 mol % to 19 mol %, and wherein $R_2O$ (mol %) minus the $Al_2O_3$ (mol %) is from −12 mol % to 4 mol %.

In implementations, the glass-ceramic materials of the disclosure, including the substrate 10 employed in the article 100 (see FIG. 1), can comprise $SiO_2$ from about 40 mol % to about 80 mol %. According to some embodiments, the glass-ceramic materials can comprise $SiO_2$ from about 50 mol % to about 75 mol %. In another implementation, the glass-ceramic materials can comprise $SiO_2$ from about 60 mol % to about 72 mol %. Accordingly, the glass-ceramic materials of the disclosure can comprise $SiO_2$ from about 40 mol % to about 80 mol %, from about 40 mol % to about 75 mol %, from about 40 mol % to about 70 mol %, from about 40 mol % to about 65 mol %, from about 40 mol % to about 60 mol %, from about 40 mol % to about 55 mol %, from about 40 mol % to about 50 mol %, from about 50 mol % to about 80 mol %, from about 50 mol % to about 75 mol %, from about 50 mol % to about 70 mol %, from about 50 mol % to about 65 mol %, from about 50 mol % to about 60 mol %, from about 60 mol % to about 80 mol %, from about 60 mol % to about 75 mol %, from about 60 mol % to about 70 mol %, and all $SiO_2$ amounts between these range endpoints.

In implementations, the glass-ceramic materials of the disclosure, including the substrate 10 employed in the article 100 (see FIG. 1), can comprise $Al_2O_3$ from about 1 mol % to about 15 mol %. According to some embodiments, the glass-ceramic materials can comprise $Al_2O_3$ from about 5 mol % to about 15 mol %. In another implementation, the glass-ceramic materials can comprise $Al_2O_3$ from about 7 mol % to about 12 mol %. Accordingly, the glass-ceramic materials of the disclosure can comprise $Al_2O_3$ from about 1 mol % to about 15 mol %, from about 1 mol % to about 14 mol %, from about 1 mol % to about 13 mol %, from about 1 mol % to about 12 mol %, from about 1 mol % to about 11 mol %, from about 1 mol % to about 10 mol %, from about 1 mol % to about 9 mol %, from about 1 mol % to about 8 mol %, from about 1 mol % to about 7 mol %, from about 1 mol % to about 6 mol %, from about 1 mol % to about 5 mol %, from about 5 mol % to about 15 mol %, from about 5 mol % to about 14 mol %, from about 5 mol % to about 13 mol %, from about 5 mol % to about 12 mol %, from about 5 mol % to about 11 mol %, from about 5 mol % to about 10 mol %, from about 7 mol % to about 15 mol %, from about 7 mol % to about 14 mol %, from about 7 mol % to about 13 mol %, from about 7 mol % to about 12 mol %, from about 7 mol % to about 11 mol %, from about 7 mol % to about 10 mol %, and all $Al_2O_3$ amounts between these range endpoints.

According to implementations, the glass-ceramic materials of the disclosure, including the substrate 10 employed in the article 100 (see FIG. 1), can comprise $B_2O_3$ from about 3 mol % to about 50 mol %. According to some embodiments, the glass-ceramic materials can comprise $B_2O_3$ from about 5 mol % to about 25 mol %. In another implementation, the glass-ceramic materials can comprise $B_2O_3$ from about 8 mol % to about 20 mol %. Accordingly, the glass-ceramic materials of the disclosure can comprise $B_2O_3$ from about 3 mol % to about 50 mol %, from about 3 mol % to about 45 mol %, from about 3 mol % to about 40 mol %, from about 3 mol % to about 35 mol %, from about 3 mol % to about 30 mol %, from about 3 mol % to about 25 mol %, from about 3 mol % to about 20 mol %, from about 3 mol % to about 15 mol %, from about 3 mol % to about 10 mol %, from about 5 mol % to about 50 mol %, from about 5 mol % to about 45 mol %, from about 5 mol % to about 40 mol %, from about 5 mol % to about 35 mol %, from about 5 mol % to about 30 mol %, from about 5 mol % to about 25 mol %, from about 5 mol % to about 20 mol %, from about 5 mol % to about 15 mol %, from about 5 mol % to about 10 mol %, from about 8 mol % to about 50 mol %, from about 8 mol % to about 45 mol %, from about 8 mol % to about 40 mol %, from about 8 mol % to about 35 mol %, from about 8 mol % to about 30 mol %, from about 8 mol % to about 25 mol %, from about 8 mol % to about 20 mol %, from about 8 mol % to about 15 mol %, and all $B_2O_3$ amounts between these range endpoints.

In further implementations, the glass-ceramic materials of the disclosure, including the substrate 10 employed in the article 100 (see FIG. 1), can comprise an alkali metal oxide ($R_2O$) from about 0 mol % to about 15 mol %, from about 2 mol % to about 14 mol %, from about 3 mol % to about 13 mol %, and all values of $R_2O$ between these values, $R_2O$ being one or more of $Li_2O$, $Na_2O$, $K_2O$, $Rb_2O$ and $Cs_2O$. In addition, implementations of the glass-ceramic materials of the disclosure are configured such that the $R_2O$ (mol %) present minus the $Al_2O_3$ present (mol %) is from −15 mol % to about 4 mol %, from about −12 mol % to about 4 mol %, from about −10 mol % to about 3 mol %, from about −8 mol % to about 1.5 mol %, and all values between these range endpoints.

According to other implementations, the glass-ceramic materials of the disclosure, including the substrate 10 employed in the article 100 (see FIG. 1), can comprise an alkaline earth metal oxide (RO) from 0 mol % to about 2 mol %, from 0 mol % to about 1 mol %, from about 0.01 mol % to about 0.5 mol %, and all values of RO between these values, RO (assuming it is present) being one or more of MgO, CaO, SrO and BaO.

In other implementations, the glass-ceramic materials of the disclosure, including the substrate 10 employed in the article 100 (see FIG. 1), can comprise $P_2O_5$ from about 0 mol % to about 3 mol %, from about 0 mol % to about 2 mol %, from about 0 mol % to about 1.5 mol %, and all values of $P_2O_5$ between these values. In further implementations, the glass-ceramic materials of the disclosure, including the substrate 10 employed in the article 100 (see FIG. 1), can comprise $SnO_2$ from about 0 mol % to about 0.5 mol %, from about 0 mol % to about 0.45 mol %, from about 0 mol % to about 0.4 mol %, from about 0 mol % to about 0.35 mol %, from about 0 mol % to about 0.3 mol %, from about 0 mol % to about 0.25 mol %, from about 0 mol % to about 0.2 mol %, from about 0 mol % to about 0.15 mol %, from about 0 mol % to about 0.1 mol %, from about 0 mol % to about 0.05 mol %, and all values of $SnO_2$ between these values. Further, in some implementations, the glass-ceramic materials of the disclosure, including the substrate 10 employed in the article 100 (see FIG. 1), can comprise $ZnO_2$ from about 0 mol % to about 5 mol %, from about 0 mol % to about 4.5 mol %, from about 0 mol % to about 4 mol %, from about 0 mol % to about 3.5 mol %, from about 0 mol % to about 3 mol %, from about 0 mol % to about 2.5 mol %, from about 0 mol % to about 2 mol %, from about 0 mol % to about 1.5 mol %, from about 0 mol % to about 1 mol %, from about 0 mol % to about 0.5 mol %, and all values of $ZnO_2$ between these values.

The glass-ceramic materials of the disclosure include $MoO_3$ from about 0.1 mol % to about 15 mol %, from about 0.1 mol % to about 7 mol %, from about 0.1 mol % to about 4.1 mol %, and all values between these ranges. Accordingly, implementations of the glass-ceramic materials of the disclosure can include $MoO_3$ from about 0.1 mol % to about 15 mol %, from about 0.1 mol % to about 14 mol %, from about 0.1 mol % to about 13 mol %, from about 0.1 mol % to about 12 mol %, from about 0.1 mol % to about 11 mol %, from about 0.1 mol % to about 10 mol %, from about 0.1 mol % to about 9 mol %, from about 0.1 mol % to about 8 mol %, from about 0.1 mol % to about 7 mol %, from about 0.1 mol % to about 6 mol %, from about 0.1 mol % to about 5 mol %, from about 0.1 mol % to about 4 mol %, from about 0.1 mol % to about 3 mol %, from about 0.1 mol % to about 2 mol %, from about 0.1 mol % to about 1 mol %, from about 0.1 mol % to about 0.5 mol %, and all values of $MoO_3$ between these range endpoints. In some embodiments, the glass-ceramic materials include from about 0 mol % to about 10 mol % $WO_3$, from about 0 mol % to about 7 mol % $WO_3$, from about 0 mol % to about 4 mol % $WO_3$, from about 0 mol % to about 3 mol % $WO_3$, from about 0 mol % to about 2 mol % $WO_3$, and all values between these endpoint ranges. Hence, $WO_3$ is optional in some embodiments, and in other embodiments can be present at trace amounts. In further implementations, the amount of $MoO_3$ and $WO_3$ is balanced such that $WO_3$ (mol %) plus the $MoO_3$ (mol %) is from about 1 mol % to about 19 mol %, from about 2 mol % to about 10 mol %, from about 3 mol % to about 6 mol %, and all values between these range endpoints.

In some embodiments, the glass-ceramic materials of the disclosure are substantially cadmium and substantially selenium free. In embodiments, the glass-ceramic can further comprise at least one dopant selected from the group consisting of H, S, Cl, Ti, V, Cr, Mn, Fe, Co, Ni, Cu, Ga, Se, Br, Zr, Nb, Ru, Rh, Pd, Ag, Cd, In, Sb, Te, I, La, Ce, Pr, Nd, Sm, Eu, Gd, Tb, Dy, Ho, Er, Tm, Yb, Lu, Ta, Os, Ir, Pt, Au, Tl, Pb, Bi, and U. In some embodiments, the at least one dopant is present in the glass-ceramic from about 0 mol % to about 0.5 mol %.

In other implementations, the glass-ceramic materials of the disclosure, including the substrate 10 employed in the article 100 (see FIG. 1), can comprise a fluorine (F) dopant from about 0 mol % to about 10 mol %, from about 0 mol % to about 7.5 mol %, from about 0 mol % to about 5 mol %, from about 0 mol % to about 2.5 mol %, and all concentrations of F between these values. In some embodiments, the addition of fluorine as a dopant can soften a melt of a glass-ceramic of the disclosure, thus reducing its melting temperature, annealing temperature and/or heat treatment temperature. In other implementations, the glass-ceramic materials of the disclosure, including the substrate 10, can comprise fluorine as a dopant in excess of 10 mol %. Further, the addition of fluorine as a dopant can increase the opacity of the resulting glass-ceramic article, particularly for fluorine additions in excess of 10 mol %.

According to further embodiments of the disclosure, glass-ceramic materials, including the substrate 10 employed in the article 100 depicted in FIG. 1, can comprise a glassy phase and at least one crystalline phase selected from the group consisting of a stoichiometric crystalline phase, a non-stoichiometric crystalline phase and a mixed stoichiometric and non-stoichiometric crystalline phase. Further, these glass-ceramic materials have crystalline phases that typically have dimensions on a nanoscale level and can be characterized as non-stoichiometric molybdenum and/or mixed molybdenum-tungsten oxides (also referred herein as "bronzes"). Though called a "bronze," the molybdenum and mixed molybdenum-tungsten bronzes are not structurally or chemically related to metallic bronze, which is an alloy of copper and tin. Rather, the term "bronze," as it relates to the molybdenum and mixed molybdenum-tungsten bronzes of the disclosure, was originally associated with the larger family of these materials, which includes sodium tungsten bronze which at a certain stoichiometric range is characterized by a brilliant, lustrous yellow color similar in hue to metallic bronzes.

In some implementations of the foregoing glass-ceramic materials of the disclosure, the crystalline phase can comprise a crystalline phase of $M_xWO_3$ and/or $M_yMoO_3$, wherein M is at least one of H, Li, Na, K, Rb, Cs, Mg, Ca, Sr, Sn, P, S, Ti, V, Cr, Mn, Fe, Co, Ni, Cu, Ga, Se, Zr, Nb, Ru, Rh, Pd, Ag, Cd, In, Sb, Te, La, Ce, Pr, Nd, Sm, Eu, Gd, Tb, Dy, Ho, Er, Tm, Yb, Lu, Ta, Os, Ir, Pt, Au, Tl, Pb, Bi, and/or U, and wherein $0 \le x \le 1$ and $0 \le y \le 1$. Further, the glass-ceramic can comprise ternary metal oxides of the general formula $M'_xM''_yO_z$, where M" is a transition metal or a combination of transition metals, M' is a metal or a combination of metals that differ from M", $2 \le z \le 5$, and x and y are based on z and the valence of M' and M". Depending on the concentration and choice of M', the material properties can range from metallic to semi-conducting, and exhibit tunable optical absorption. The structure of these bronzes is a solid state defect structure in which M' cations intercalate into holes or channels of the binary oxide host ($M''_yO_z$) and disassociate into $M^+$ cations and free electrons. In turn, as x is varied, these materials can exist as a broad sequence of solid phases, with varying levels of heterogeneity.

Non-limiting compositions of glass-ceramics according to the principles of the disclosure are listed below in Tables 1A-1C (reported in mol %). Table 1A lists glass-ceramic compositions with mixed amounts of $MoO_3$ and $WO_3$. Table 1B lists glass-ceramic compositions with $MoO_3$ content and no $WO_3$. Table 1C lists glass-ceramic compositions with mixed amounts of $WO_3$ and $V_2O_5$.

Table 1A lists various fusion compatible, peralkaline mixed molybdenum-tungsten glass-ceramic compositions (Exs. 1, 2 and 4-22). In particular, each of these glass-ceramic compositions includes a combination of $WO_3$ and $MoO_3$, among other constituents. According to implementations of the disclosure, these compositions are suitable for various monolithic glazing applications. In two exemplary implementations, the Ex. 1 and Ex. 2 glass-ceramic compositions are particularly suited for fusion-forming, tinted UV- and IR-absorbing glazing applications.

TABLE 1A

Glass-ceramic compositions with mixed amounts of $MoO_3$ and $WO_3$ (mol %)

|  | Ex. 1* | Ex. 2* | Ex. 4** | Ex. 5 | Ex. 6 | Ex. 7 | Ex. 8 | Ex. 9 | Ex. 10 | Ex. 11 |
|---|---|---|---|---|---|---|---|---|---|---|
| $SiO_2$ | 67.167 | 67.181 | 67.125 | 67.167 | 67.167 | 67.181 | 65.236 | 65.236 | 67.102 | 67.125 |
| $Al_2O_3$ | 9.615 | 9.617 | 9.609 | 9.615 | 9.615 | 9.617 | 11.601 | 11.601 | 9.606 | 9.609 |
| $B_2O_3$ | 9.423 | 9.425 | 9.417 | 9.423 | 9.423 | 9.425 | 7.037 | 7.037 | 9.414 | 9.417 |
| $Li_2O$ | 4.845 | 4.845 | 3.843 | 4.844 | 4.845 | 4.846 | 4.374 | 4.374 | 3.842 | 3.843 |
| $Na_2O$ | 4.996 | 4.997 | 4.407 | 4.996 | 4.996 | 4.997 | 7.775 | 7.775 | 4.406 | 4.407 |
| $K_2O$ | 0.021 | 0.021 | 1.586 | 0.021 | 0.021 | 0.021 | 0.000 | 0.000 | 1.585 | 1.586 |
| $Cs_2O$ | 0.000 | 0.000 | 0.000 | 0.000 | 0.000 | 0.000 | 0.000 | 0.000 | 0.000 | 0.000 |
| $SnO_2$ | 0.048 | 0.048 | 0.048 | 0.048 | 0.048 | 0.048 | 0.095 | 0.095 | 0.048 | 0.048 |
| $WO_3$ | 2.885 | 1.924 | 2.883 | 3.606 | 3.365 | 0.962 | 2.853 | 1.902 | 2.882 | 1.922 |
| $MoO_3$ | 0.962 | 1.923 | 0.961 | 0.240 | 0.481 | 2.885 | 0.951 | 1.902 | 0.961 | 1.922 |
| MgO | 0.021 | 0.000 | 0.000 | 0.021 | 0.021 | 0.000 | 0.000 | 0.000 | 0.000 | 0.000 |
| CaO | 0.019 | 0.019 | 0.121 | 0.019 | 0.019 | 0.019 | 0.079 | 0.079 | 0.121 | 0.121 |
| $V_2O_5$ | 0.000 | 0.000 | 0.000 | 0.000 | 0.000 | 0.000 | 0.000 | 0.000 | 0.034 | 0.000 |

TABLE 1A-continued

Glass-ceramic compositions with mixed amounts of MoO₃ and WO₃ (mol %)

| | Ex. 12 | Ex. 13 | Ex. 14 | Ex. 15 | Ex. 16 | Ex. 17 | Ex. 18 | Ex. 19 | Ex. 20 | Ex. 21 | Ex. 22 |
|---|---|---|---|---|---|---|---|---|---|---|---|
| $SiO_2$ | 67.103 | 66.964 | 66.804 | 66.486 | 66.964 | 66.804 | 66.645 | 67.159 | 67.151 | 62.968 | 62.378 |
| $Al_2O_3$ | 9.606 | 9.586 | 9.563 | 9.518 | 9.586 | 9.563 | 9.540 | 9.614 | 9.613 | 13.285 | 13.160 |
| $B_2O_3$ | 9.414 | 9.394 | 9.372 | 9.327 | 9.395 | 9.372 | 9.350 | 9.422 | 9.421 | 4.737 | 4.693 |
| $Li_2O$ | 3.842 | 3.834 | 3.825 | 3.807 | 3.834 | 3.825 | 3.816 | 4.844 | 6.766 | 7.942 | 7.867 |
| $Na_2O$ | 4.406 | 4.397 | 4.386 | 4.365 | 4.397 | 4.386 | 4.376 | 4.995 | 3.078 | 1.870 | 1.853 |
| $K_2O$ | 1.585 | 1.582 | 1.578 | 1.570 | 1.582 | 1.578 | 1.574 | 0.021 | 0.029 | 0.034 | 0.034 |
| $Cs_2O$ | 0.000 | 0.000 | 0.000 | 0.000 | 0.000 | 0.000 | 0.000 | 0.000 | 0.000 | 0.000 | 0.000 |
| $SnO_2$ | 0.048 | 0.048 | 0.048 | 0.048 | 0.048 | 0.048 | 0.048 | 0.096 | 0.096 | 0.095 | 0.094 |
| $WO_3$ | 1.921 | 2.876 | 2.869 | 2.855 | 1.917 | 1.913 | 1.908 | 2.884 | 2.884 | 6.146 | 7.025 |
| $MoO_3$ | 1.921 | 1.198 | 1.434 | 1.904 | 2.157 | 2.391 | 2.624 | 0.961 | 0.961 | 0.945 | 0.937 |
| MgO | 0.000 | 0.000 | 0.000 | 0.000 | 0.000 | 0.000 | 0.000 | 0.000 | 0.000 | 0.000 | 0.000 |
| CaO | 0.121 | 0.121 | 0.121 | 0.120 | 0.121 | 0.120 | 0.120 | 0.003 | 0.002 | 0.142 | 0.140 |
| $V_2O_5$ | 0.034 | 0.000 | 0.000 | 0.000 | 0.000 | 0.000 | 0.000 | 0.000 | 0.000 | 0.000 | 0.000 |
| $Fe_2O_3$ | 0.000 | 0.000 | 0.000 | 0.000 | 0.000 | 0.000 | 0.000 | 0.000 | 0.000 | 0.003 | 0.002 |
| $P_2O_5$ | 0.000 | 0.000 | 0.000 | 0.000 | 0.000 | 0.000 | 0.000 | 0.000 | 0.000 | 1.834 | 1.817 |

Figure 3A:
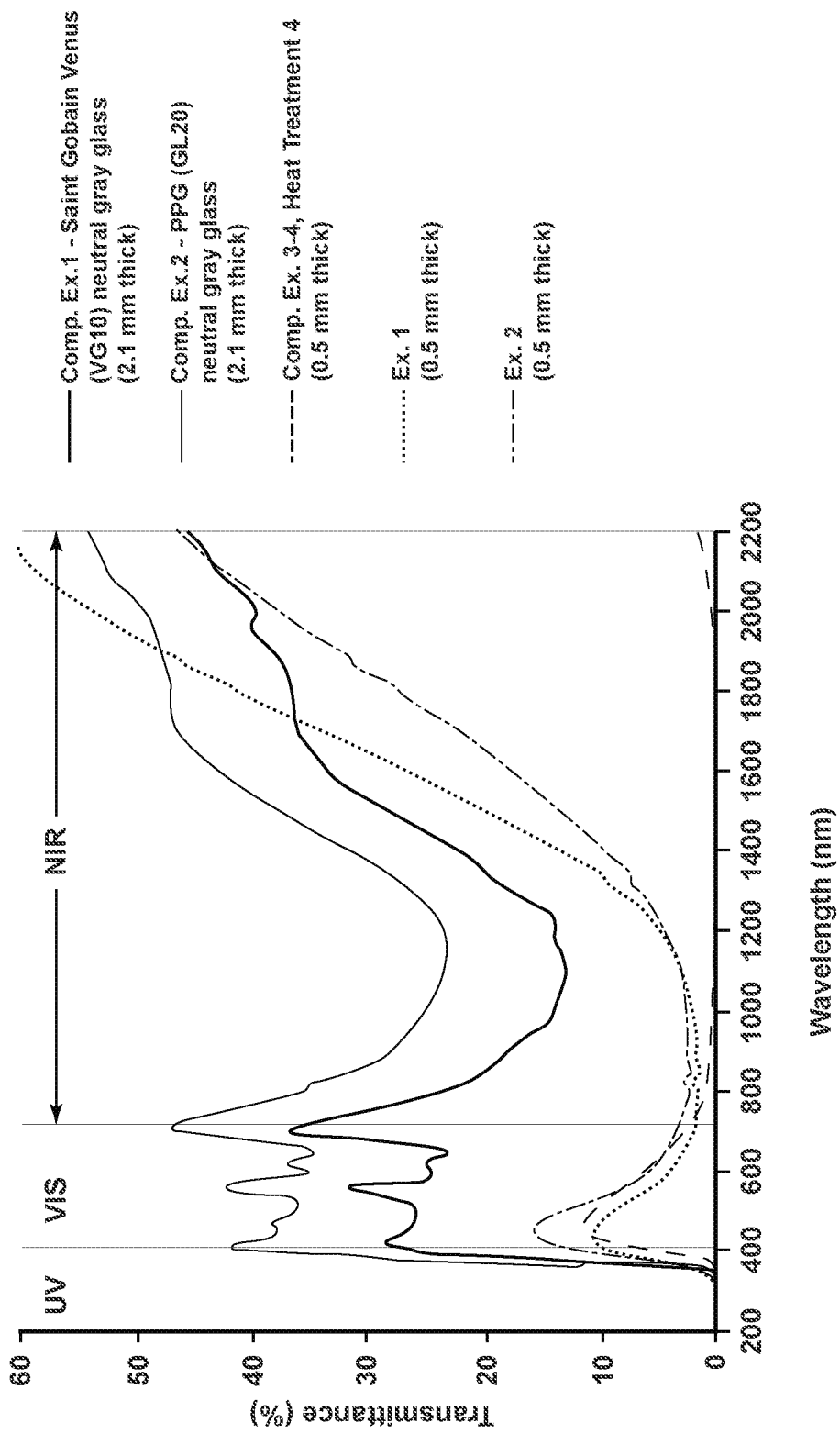
FIG. 3A is a plot of transmittance vs. wavelength of comparative neutral grey-tinted glass compositions, a comparative tungsten oxide-containing glass-ceramic composition subjected to a heat treatment, and mixed tungsten oxide- and molybdenum oxide-containing glass-ceramics subjected to a heat treatment, according to examples of the disclosure.
Figure 3B:
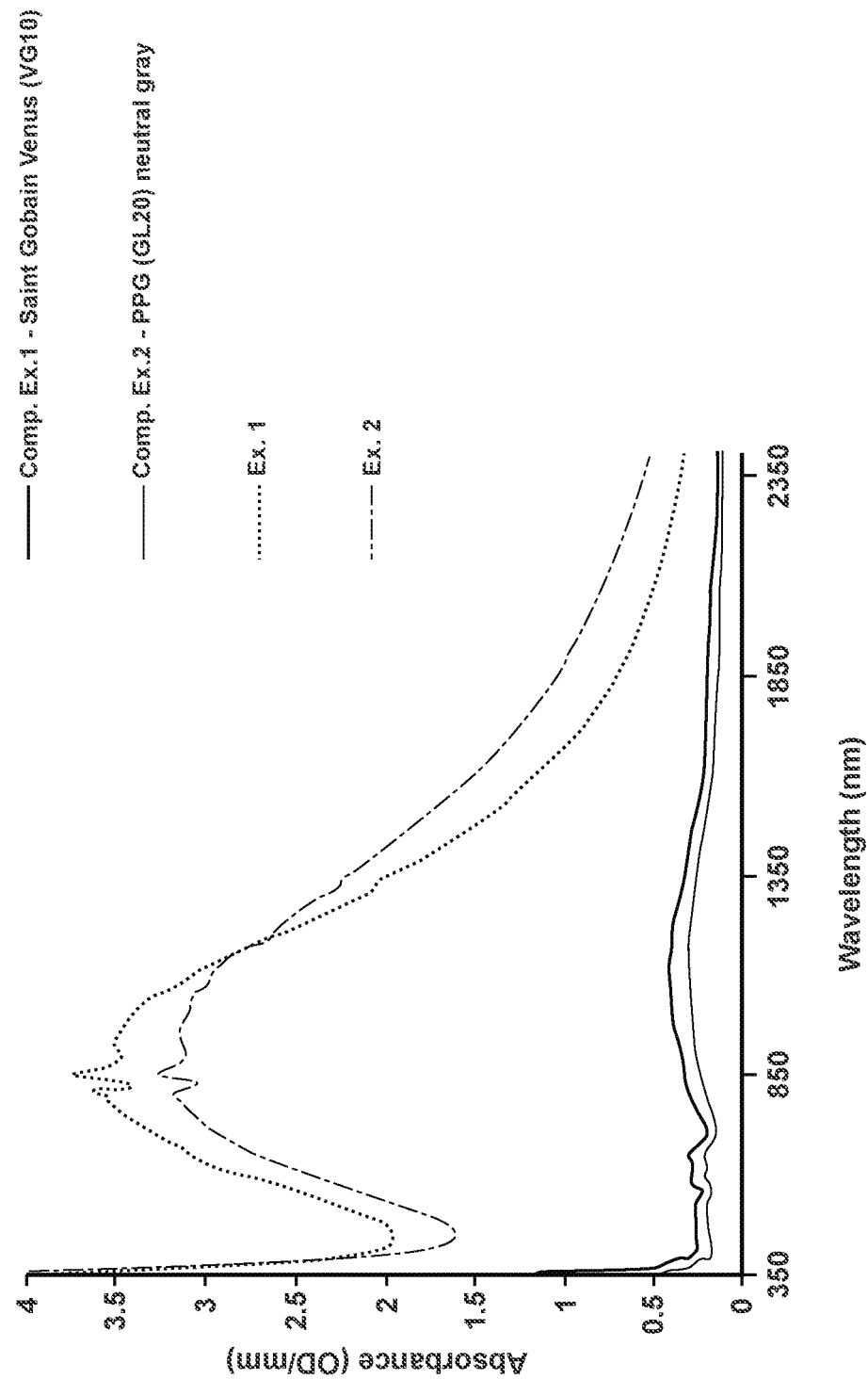
FIG. 3B is a plot of absorbance vs. wavelength of comparative neutral grey-tinted glass compositions and mixed tungsten oxide- and molybdenum oxide-containing glass-ceramics subjected to a heat treatment, according to examples of the disclosure.
Figure 5:
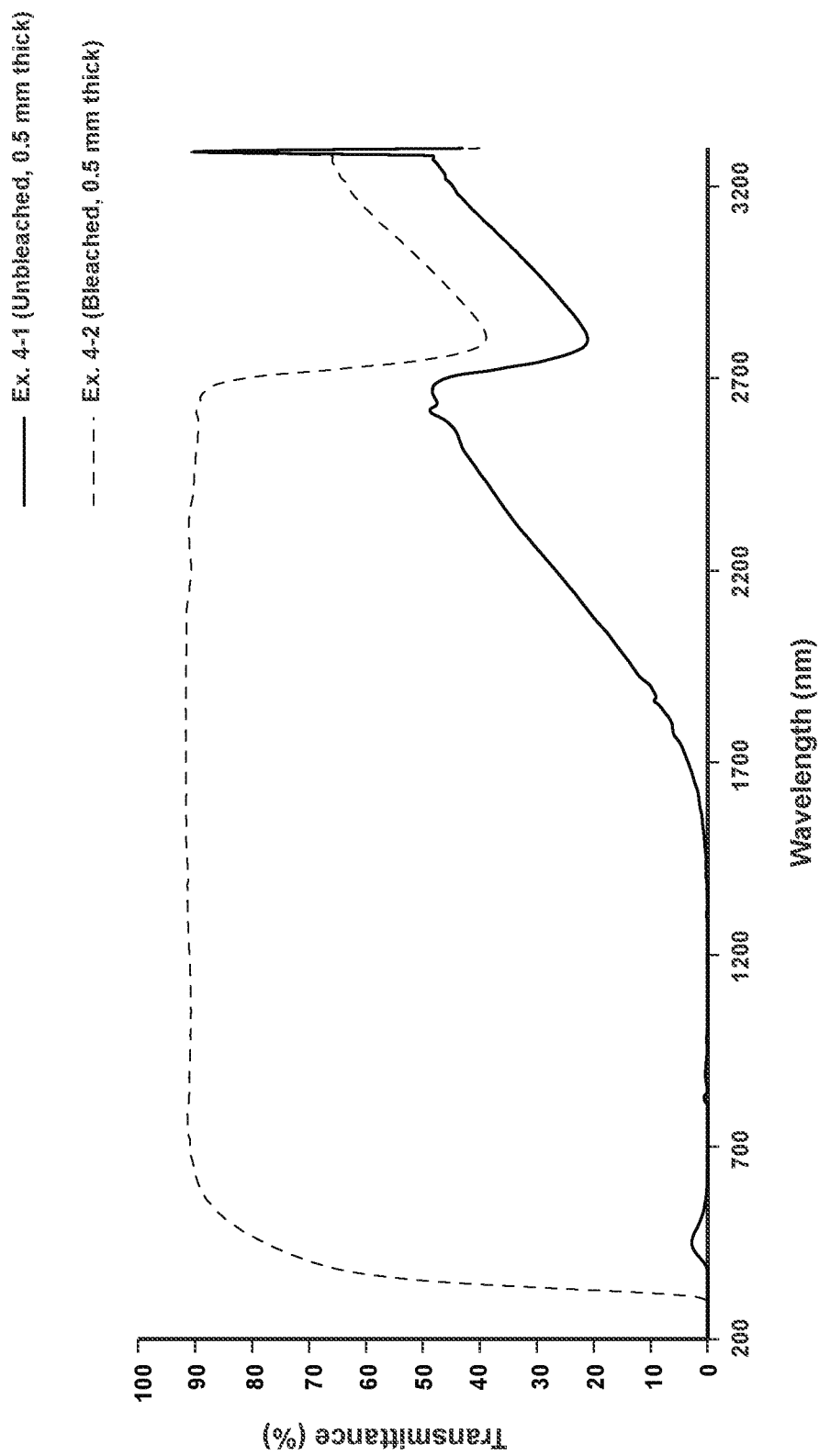
FIG. 5 is a plot of transmittance vs. wavelength of a bleached and an un-bleached mixed tungsten oxide- and molybdenum oxide-containing glass-ceramic subjected to a heat treatment, according to examples of the disclosure.

*See also FIGS. 3A & 3B and their corresponding description
**See also FIG. 5 and its corresponding description Table 1B lists various peraluminous pure molybdenum bronze glass-ceramic compositions (i.e., Exs. 3 and 23-29). In particular, each of these glass-ceramic compositions includes $MoO_3$ and no intentional addition of $WO_3$, among other constituents. According to implementations of the disclosure, these compositions are suitable for various applications including, but not limited to, use as ultra-thin (i.e., about 100 microns or less) optical filters, and tinted UV and IR-absorbing additive in laminate glazing interlayers.

TABLE 1B

Glass-ceramic compositions with MoO₃ and no WO₃ (mol %)

| | Ex. 3*** | Ex. 23 | Ex. 24 | Ex. 25 | Ex. 26 | Ex. 27 | Ex. 28 | Ex. 29 |
|---|---|---|---|---|---|---|---|---|
| $SiO_2$ | 63.902 | 63.907 | 63.901 | 63.902 | 64.902 | 62.902 | 65.315 | 60.153 |
| $Al_2O_3$ | 9.000 | 9.000 | 9.000 | 9.000 | 9.000 | 10.999 | 13.958 | 13.958 |
| $B_2O_3$ | 19.999 | 20.001 | 19.999 | 19.999 | 19.999 | 19.999 | 13.472 | 13.472 |
| $Li_2O$ | 2.999 | 0.000 | 0.000 | 0.000 | 2.999 | 2.999 | 3.066 | 4.088 |
| $Na_2O$ | 0.000 | 2.991 | 0.000 | 0.000 | 0.000 | 0.000 | 0.000 | 0.000 |
| $K_2O$ | 0.000 | 0.000 | 3.000 | 0.000 | 0.000 | 0.000 | 0.000 | 0.000 |
| $Cs_2O$ | 0.000 | 0.000 | 0.000 | 3.000 | 0.000 | 0.000 | 0.000 | 0.000 |
| $SnO_2$ | 0.100 | 0.100 | 0.100 | 0.100 | 0.100 | 0.100 | 0.102 | 0.153 |
| $WO_3$ | 0.000 | 0.000 | 0.000 | 0.000 | 0.000 | 0.000 | 0.000 | 0.000 |
| $MoO_3$ | 4.000 | 4.000 | 4.000 | 4.000 | 3.000 | 3.000 | 4.088 | 8.176 |
| MgO | 0.000 | 0.000 | 0.000 | 0.000 | 0.000 | 0.000 | 0.000 | 0.000 |
| CaO | 0.000 | 0.000 | 0.000 | 0.000 | 0.000 | 0.000 | 0.000 | 0.000 |
| $V_2O_5$ | 0.000 | 0.000 | 0.000 | 0.000 | 0.000 | 0.000 | 0.000 | 0.000 |

Figure 4A:
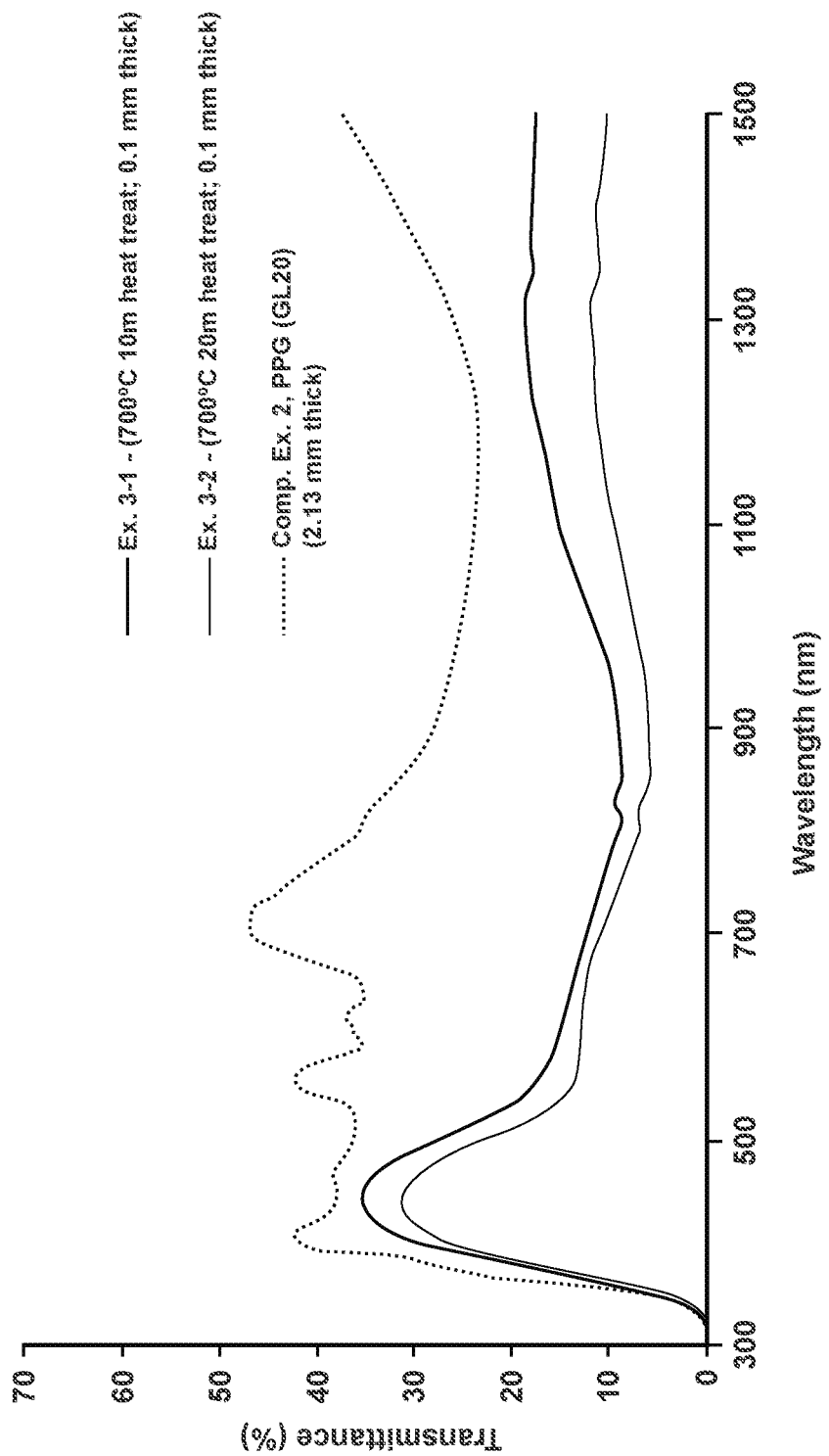
FIG. 4A is a plot of transmittance vs. wavelength of a comparative neutral grey-tinted glass composition and a molybdenum oxide-containing glass-ceramic composition subjected to two heat treatments, according to examples of the disclosure.
Figure 4B:
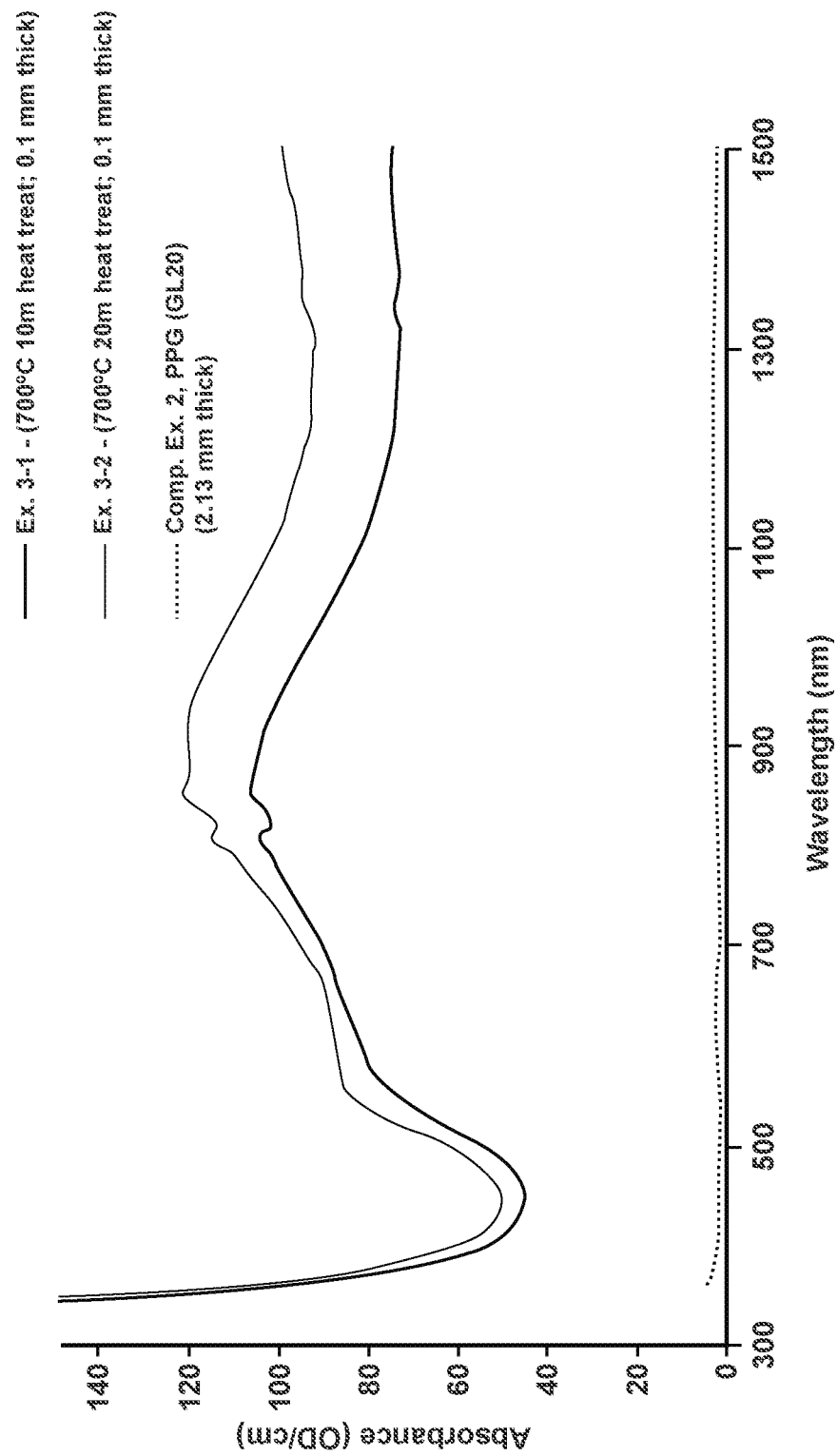
FIG. 4B is a plot of absorbance vs. wavelength for the samples depicted in the transmittance vs. wavelength plot of FIG. 4A, according to examples of the disclosure.

***See also FIGS. 4A & 4B and their corresponding description

Finally, Table 1C below lists various mixed tungsten and vanadium oxide-containing glass-ceramic compositions (i.e., Exs. 30-35). In particular, each of these glass-ceramic compositions includes $V_2O_5$ and $WO_3$, among other constituents. According to implementations of the disclosure, these compositions are suitable for various monolithic glazing applications. In embodiments, these compositions develop a neutral grey or a brown hue upon being subjected to the heat treatment methods outlined in the disclosure.

TABLE 1C

Glass-ceramic compositions with mixed amounts of WO₃ and V₂O₅ (mol %)

| | Ex. 30 | Ex. 31 | Ex. 32 | Ex. 33**** | Ex. 34 | Ex. 35 |
|---|---|---|---|---|---|---|
| $SiO_2$ | 67.102 | 67.105 | 67.287 | 67.155 | 67.116 | 66.955 |
| $Al_2O_3$ | 9.606 | 9.606 | 9.632 | 9.613 | 9.608 | 9.585 |
| $B_2O_3$ | 9.414 | 9.414 | 9.440 | 9.421 | 9.416 | 9.393 |
| $Li_2O$ | 3.842 | 3.842 | 4.853 | 4.844 | 4.841 | 4.829 |
| $Na_2O$ | 4.406 | 4.406 | 4.813 | 4.995 | 4.992 | 4.980 |
| $K_2O$ | 1.585 | 1.585 | 0.021 | 0.021 | 0.021 | 0.021 |
| $Cs_2O$ | 0.000 | 0.000 | 0.000 | 0.000 | 0.000 | 0.000 |
| $SnO_2$ | 0.048 | 0.048 | 0.048 | 0.048 | 0.048 | 0.048 |
| $WO_3$ | 3.842 | 3.843 | 3.853 | 3.845 | 3.843 | 3.834 |
| $MoO_3$ | 0.000 | 0.000 | 0.000 | 0.000 | 0.000 | 0.000 |
| MgO | 0.000 | 0.000 | 0.000 | 0.000 | 0.000 | 0.000 |
| CaO | 0.121 | 0.121 | 0.019 | 0.019 | 0.019 | 0.019 |
| $V_2O_5$ | 0.034 | 0.029 | 0.034 | 0.038 | 0.096 | 0.335 |

Figure 6:
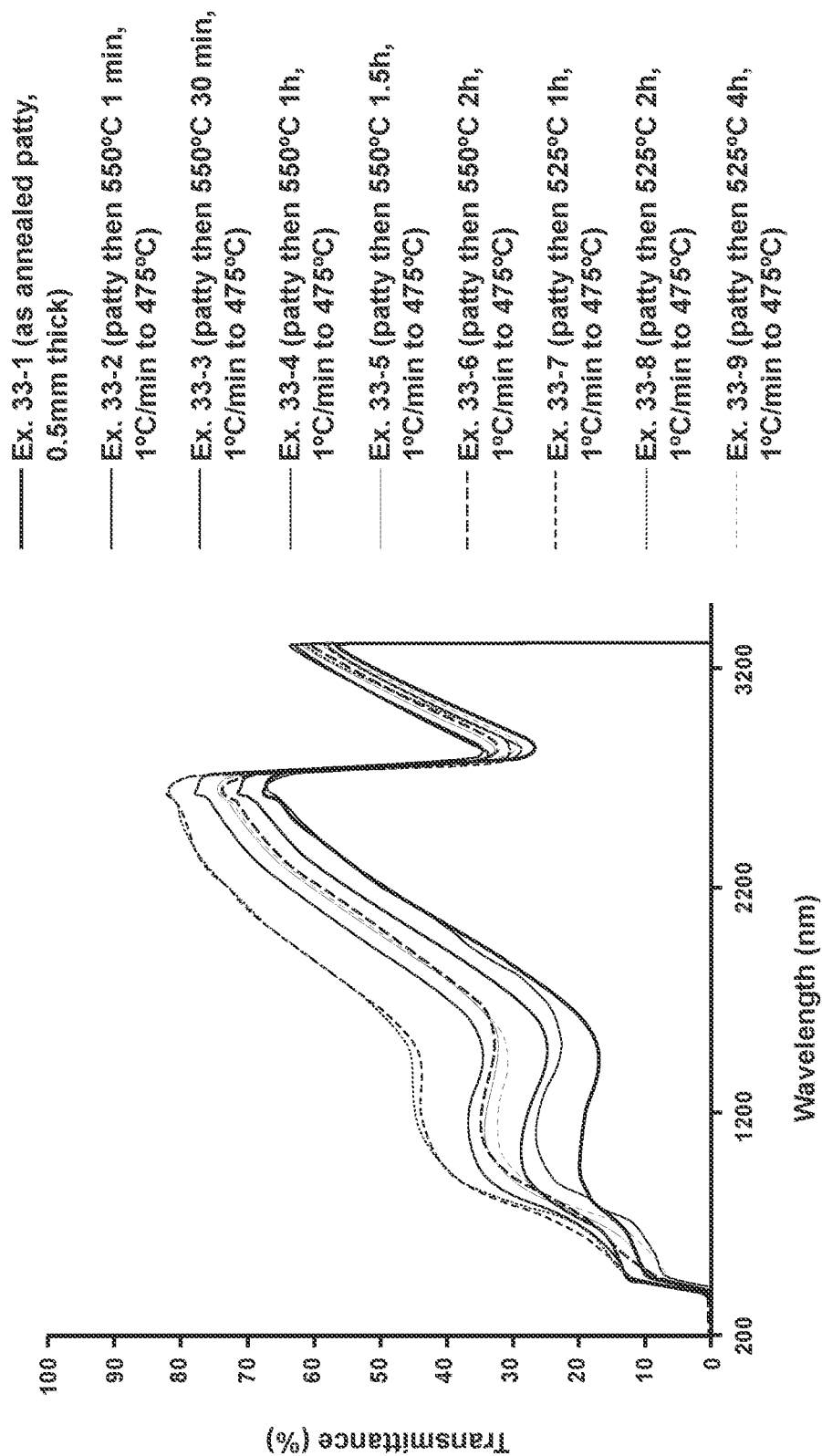
FIG. 6 is a plot of transmittance vs. wavelength of a vanadium and tungsten oxide-containing glass-ceramic composition subjected to various heat treatments, according to examples of the disclosure.

****See also FIG. 6 and its corresponding description

In view of the exemplary glass-ceramic compositions listed above in Tables 1A and 1B, the substrate 10 of the article 100 (see FIG. 1) can be characterized by a glass-ceramic composition given by: $MoO_3$ from 0.1 mol % to about 15 mol %; $WO_3$ from 0 to 10 mol %; and, optionally, at least one alkali metal oxide from 0 to 15 mol %; and a balance of a silicate-containing glass. Also as exemplified by the compositions listed in Tables 1A and 1B, the substrate 10 of the article 100 (see FIG. 1) can be characterized by the following glass-ceramic composition: 40 mol %≤$SiO_2$≤80 mol %; 1 mol %≤$Al_2O_3$≤15 mol %; 3 mol %≤$B_2O_3$≤50 mol %; 0 mol %≤$R_2O$≤15 mol %, $R_2O$ is one or more of $Li_2O$, $Na_2O$, $K_2O$, $Rb_2O$ and $Cs_2O$; 0 mol %≤RO≤2 mol %, RO is one or more of MgO, CaO, SrO and BaO; 0 mol %≤$P_2O_5$≤3 mol %; 0 mol %≤$SnO_2$≤0.5 mol %; 0.1 mol %≤$MoO_3$≤15 mol %; and 0 mol %≤$WO_3$≤10 mol %, wherein the $WO_3$ (mol %) plus the $MoO_3$ (mol %) is from 1 mol % to 19 mol %, and wherein $R_2O$ (mol %) minus the $Al_2O_3$ (mol %) is from −12 mol % to 4 mol %.

Further, in view of the compositions listed in Table 1C, the substrate 10 of the article 100 (see FIG. 1) can be characterized by a glass-ceramic composition given by: $MoO_3$ from 0 mol % to about 15 mol %; $WO_3$ from 0.1 mol % to 10 mol %; $V_2O_5$ from 0.01 mol % to 0.2 mol %; optionally, at least one alkali metal oxide from 0 to 15 mol %; and a balance of a silicate-containing glass. Also as exemplified by the compositions listed in Table 1C, the substrate 10 of the article 100 (see FIG. 1) can be characterized by the following glass-ceramic composition: 40 mol %≤$SiO_2$≤80 mol %; 1 mol %≤$Al_2O_3$≤15 mol %; 3 mol %≤$B_2O_3$≤50 mol %; 0.01 mol %≤$V_2O_5$≤0.2 mol %; 0 mol %≤$R_2O$≤15 mol %, $R_2O$ is one or more of $Li_2O$, $Na_2O$, $K_2O$, $Rb_2O$ and $Cs_2O$; 0 mol %≤RO≤2 mol %, RO is one or more of MgO, CaO, SrO and BaO; 0 mol %≤$P_2O_5$≤3 mol %; 0 mol %≤$SnO_2$≤0.5 mol %; 0 mol %≤$MoO_3$≤15 mol %; and 0.1 mol %≤$WO_3$≤10 mol %, wherein the $WO_3$ (mol %) plus the $MoO_3$ (mol %) is from 1 mol % to 19 mol %, and wherein $R_2O$ (mol %) minus the $Al_2O_3$ (mol %) is from −12 mol % to 4 mol %.

Also in view of the compositions listed in Tables 1A-1C, the substrate 10 employed in the article 100 depicted in FIG. 1 can comprise a glassy phase and at least one crystalline phase selected from the group consisting of a stoichiometric crystalline phase, a non-stoichiometric crystalline phase and a mixed stoichiometric and non-stoichiometric crystalline phase. In addition, the crystalline phase can comprise a crystalline phase of $M_xWO_3$ and/or $M_yMoO_3$, wherein M is at least one of H, Li, Na, K, Rb, Cs, Mg, Ca, Sr, Sn, P, S, Ti, V, Cr, Mn, Fe, Co, Ni, Cu, Ga, Se, Zr, Nb, Ru, Rh, Pd, Ag, Cd, In, Sb, Te, La, Ce, Pr, Nd, Sm, Eu, Gd, Tb, Dy, Ho, Er, Tm, Yb, Lu, Ta, Os, Ir, Pt, Au, Tl, Pb, Bi, and/or U, and wherein 0≤x≤1 and 0≤y≤1. Further, the glass-ceramic can comprise ternary metal oxides of the general formula $M'_xM''_yO_z$, where M" is a transition metal or a combination of transition metals, M' is a metal or a combination of metals that differ from M", 2≤z≤5, and x and y are based on z and the valence of M' and M". In some implementations of the glass-ceramic compositions of the disclosure containing vanadium and tungsten (e.g., Exs. 30-35, Table 1C), or vanadium, tungsten and molybdenum (e.g., Exs. 10 and 12, Table 1A), the crystalline phase can form a bronze crystalline phase comprising these metals.

According to some embodiments of the glass-ceramic materials of the disclosure, including the substrate 10 employed in the article 100 (see FIG. 1), compositions comparable to those listed above in Tables 1A-1C can include additional species to alter or otherwise enhance their optical absorption characteristics. These species include the following elements or their oxides: H, S, Cl, Ti, V, Cr, Mn, Fe, Co, Ni, Cu, Ga, Se, Br, Zr, Nb, Ru, Rh, Pd, Ag, Cd, In, Sb, Te, I, La, Ce, Pr, Nd, Sm, Eu, Gd, Tb, Dy, Ho, Er, Tm, Yb, Lu, Ta, Os, Ir, Pt, Au, Tl, Pb, Bi, and U. According to one implementation, vanadium and/or nickel oxide can be added from about 0.005 mol % to about 0.1 mol % to the glass-ceramic composition to obtain a neutral grey tint, which is a preferable tint for certain vehicular glazing applications.

According to embodiments, the glass-ceramic materials of the disclosure, including the substrate 10 of the article 100 depicted in FIG. 1, can be made by employing a melt quench process, followed by a heat treatment. Appropriate ratios of the constituents may be mixed and blended by turbulent mixing and/or ball milling. The batched material is then melted at temperatures ranging from about 1500° C. to about 1700° C. for a predetermined time. In some implementations, the predetermined time ranges from about 6 to about 12 hours, after which time the resulting melt can be cast or formed and then annealed, as understood by those with skill in the field of the disclosure. In some embodiments, the melt can be annealed between about 500° C. and about 600° C. to define an annealed melt, which is the form of a glass.

At this stage of the method, the annealed melt is heat treated between about 500° C. to about 1000° C. from about 5 minutes to about 48 hours to form the glass-ceramic. In embodiments, the heat treating step is conducted at or slightly above the annealing point of the glass-ceramic, and below its softening point, to develop one or more crystalline tungstate phases. In some embodiments, the annealed melt is heat treated between about 600° C. and about 800° C. from about 5 minutes to about 24 hours to form the glass-ceramic. According to some embodiments, the annealed melt is heat treated between about 650° C. and about 725° C. from about 45 minutes to about 3 hours to form the glass-ceramic. In another implementation, the annealed melt is heat treated according to a temperature and time to obtain particular optical properties, e.g., the various total transmittance levels outlined earlier in the disclosure within the visible spectrum, NIR spectrum and UV spectrum. Further, as is outlined below in the examples, additional heat treatment temperatures and times can be employed to obtain glass-ceramic materials according to the principles of the disclosure.

In another aspect of the disclosure, a method of making a glass-ceramic (e.g., the substrate 10 of the article 100 depicted in FIG. 1) is provided that includes mixing a batch comprising: 40 mol %≤$SiO_2$≤80 mol %; 1 mol %≤$Al_2O_3$≤15 mol %; 3 mol %≤$B_2O_3$≤50 mol %; 0 mol %≤$R_2O$≤15 mol %, $R_2O$ is one or more of $Li_2O$, $Na_2O$, $K_2O$, $Rb_2O$ and $Cs_2O$; 0 mol %≤RO≤2 mol %, RO is one or more of MgO, CaO, SrO and BaO; 0 mol %≤$P_2O_5$≤3 mol %; 0 mol %≤$SnO_2$≤0.5 mol %; 0.1 mol %≤$MoO_3$≤15 mol %; and 0 mol %≤$WO_3$≤10 mol %, wherein the $WO_3$ (mol %) plus the $MoO_3$ (mol %) is from 1 mol % to 19 mol %, and wherein $R_2O$ (mol %) minus the $Al_2O_3$ (mol %) is from −12 mol % to 4 mol %. In a related aspect of the disclosure, the method include mixing a batch comprising: 40 mol %≤$SiO_2$≤80 mol %; 1 mol %≤$Al_2O_3$≤15 mol %; 3 mol %≤$B_2O_3$≤50 mol %; 0.01 mol %≤$V_2O_5$≤0.2 mol %; 0 mol %≤$R_2O$≤15 mol %, $R_2O$ is one or more of $Li_2O$, $Na_2O$, $K_2O$, $Rb_2O$ and $Cs_2O$; 0 mol %≤RO≤2 mol %, RO is one or more of MgO, CaO, SrO and BaO; 0 mol %≤$P_2O_5$≤3 mol %; 0 mol %≤$SnO_2$≤0.5 mol %; 0 mol %≤$MoO_3$≤15 mol %; and 0.1 mol %≤$WO_3$≤10 mol %, wherein the $WO_3$ (mol %) plus the $MoO_3$ (mol %) is from 1 mol % to 19 mol %, and wherein $R_2O$ (mol %) minus the $Al_2O_3$ (mol %) is from −12 mol % to 4 mol %. The method also includes: melting the batch between about 1500° C. and about 1700° C. to form a melt; annealing the melt between about 500° C. and about 600° C. to define an annealed melt; and heat treating the annealed melt between about 500° C. and about 1000° C. from about 5 minutes to about 48 hours to form the glass-ceramic. In some embodiments of the foregoing method of making a glass-ceramic, the heat treating comprises heat treating the annealed melt between about 600° C. and about 800° C. from about 5 minutes to about 24 hours to form the glass-ceramic.

With further regard to the foregoing methods of making the glass-ceramics of the disclosure, it has been observed that compositions with mixed molybdenum and tungsten content (e.g., as listed in Table 1A); and mixed vanadium and tungsten content (e.g., as listed in Table 1C) that are slightly peralkaline (e.g., $R_2O$—$Al_2O_3$>~0.25 mol %) have resulted in the formation of both a glass and dense liquid phase. In particular, a low viscosity liquid was observed during the step in which the glass was poured from a crucible onto a steel table to form a patty. X-ray diffraction (XRD) analysis revealed that this low viscosity liquid phase was a mixture of various stoichiometric alkali tungstates (e.g., $R_2WO_4$, where R=Li, Na, K and/or Cs). Additional experimentation led to the unexpected realization that the concentration of the alkali tungstate second phase could be reduced by additional and more thorough mixing of the as-formed glass-ceramic (e.g., as made according to the foregoing method, and then pulverized or otherwise reduced to particles and chunks), and then re-melting the mixture at a high temperature (i.e., at or above 1500° C.). Further, additional improvements were observed by employing small batch sizes (e.g., ~1000 g or less). The net result is that the glass-ceramic materials of the disclosure can be formed as a homogenous, single-phase glass (e.g., as it would exist prior to heat treatment). Accordingly, in another implementation of the foregoing method of making a glass-ceramic, the method can include the following additional steps: reducing the melt to a plurality of particles; re-mixing the melt comprising a plurality of particles into a second batch; re-melting the second batch between about 1500° C. and about 1700° C. to form a second melt. The reducing, re-mixing and re-melting steps are conducted after the step of melting the batch and before the step of annealing the melt. Further, the melt in the step of annealing is the second melt.

Referring again to the foregoing methods of making the glass-ceramics of the disclosure, without being bound by theory, it is believed that the formation of an alkali tungstate phase occurs during the initial stages of the melt, where tungsten oxide reacts with free or unbound alkali carbonates. Note that the terms "free" and "unbound" are used interchangeably to refer to an alkali that is not bonded to boron, aluminum and/or silicon atoms. Due to the high density of alkali tungstate relative to the borosilicate glass that is formed, it rapidly segregates and/or stratifies, pooling at the bottom of the crucible. Despite the phase not being truly immiscible, the alkali tungstate does not rapidly solubilize in the glass due to the significant difference in density. Accordingly, a single-melt process that is 1000 grams in weight or more (not including any subsequent heat treatment) may not always be successful in forming a single-phase glass from the glass-ceramic compositions of the disclosure; nevertheless, embodiments of the method that involve a subsequent mixing of particles of the as-formed glass and the alkali tungstate phase (i.e., as crushed into particulate) can be successfully made into a homogenous, single-phase glass (e.g., that later can be formed into a glass-ceramic via subsequent heat treatment steps).

According to another embodiment, the foregoing methods of making the glass-ceramics of the disclosure can include a provision for including precursor materials of a particular form to improve homogeneity and reduce or eliminate the presence of an alkali tungstate second phase. In particular, introducing alkali metal constituents during the step of mixing the batch in a 'compounded' or 'bound' form can achieve these beneficial effects on the microstructure of the glass formed from the process (i.e., prior to any heat treatment). In particular, these embodiments include the introduction of alkali metal oxides in the form of naturally occurring (e.g., as mined and/or dug up from the earth) or synthetically prepared (e.g., as melted in a laboratory) feldspars, nepheline, alkali borate (where the alkali is one or any combination of Li, Na, K, Rb and Cs) and/or spodumene. Further, the improvements realized with the selection of the alkali metal oxide precursor materials can facilitate the selection of glass-ceramic compositions that are higher in alkali metal content, e.g., strongly peralkaline ($R_2O$—$Al_2O_3$ is greater than or equal to about 2.0 mol %), but can still be formed without the development of an alkali tungstate second phase. Other types of raw material selection are envisioned that can prevent the formation of an alkali tungstate second phase including the addition of recycled glass cullet and/or the addition tungsten (W) in form of aluminum tungstate.

According to another aspect of the disclosure, a method of making a glass-ceramic article in a patterned form is provided. Inherent in these methods is the observation that exposure of the glass-ceramics (e.g., a substrate 10 employed in the article 100 depicted in FIG. 1) of the disclosure to certain laser wavelengths with sufficient pump power density to raise the local temperature to ≥600° C. causes the exposed region to turn from a blue or grey color to a transparent water white or yellow-tinted glass. Without being bound by theory, these color transitions are believed to be due to the thermal decomposition of the UV- and NIR-absorbing molybdenum crystalline phase or mixed molybdenum tungsten bronze crystalline phases. Thus, partial or complete decomposition of these phases can allow for the modulation of the optical extinction in the UV, VIS, and NIR regimes. In turn, a rastering of a laser along the surface (e.g., primary surfaces 12, 14 of the substrate 10 shown in FIG. 1) to selectively bleach desired regions can result in patterns created within the substrate 10, thus forming an article 100 in a patterned form.

In embodiments, the glass-ceramic articles of the disclosure can be bleached or otherwise patterned by lasers operating at wavelengths including but not limited to 355 nm, 810 nm, and 10.6 µm. Further, laser operating at wavelengths below 500 nm and those operating between 700 and 1700 nm would also be suitable to bleach these glass-ceramics. Upon exposure to these wavelengths with sufficient pump power density the exposed region will turn from a blue or grey color to a transparent water white or faint yellow-tinted glass. By rastering the laser along the surface to selectively bleach desired regions of the substrate, e.g., substrate 10 of the article 100 depicted in FIG. 1, patterns can be created within the glass-ceramic substrate. When the blue or grey color is bleached, the glass is no longer absorptive in the NIR spectrum in the colorless exposed region(s); consequently, the process can be self-limiting.

According to another aspect of the disclosure, a method of making a patterned glass-ceramic article is provided that includes providing a substrate having a glass-ceramic composition comprising: 40 mol % ≤ $SiO_2$ ≤ 80 mol %; 1 mol % ≤ $Al_2O_3$ ≤ 15 mol %; 3 mol % ≤ $B_2O_3$ ≤ 50 mol %; 0 mol % ≤ $R_2O$ ≤ 15 mol %, $R_2O$ is one or more of $Li_2O$, $Na_2O$, $K_2O$, $Rb_2O$ and $Cs_2O$; 0 mol % ≤ RO ≤ 2 mol %, RO is one or more of MgO, CaO, SrO and BaO; 0 mol % ≤ $P_2O_5$ ≤ 3 mol %; 0 mol % ≤ $SnO_2$ ≤ 0.5 mol %; 0.1 mol % ≤ $MoO_3$ ≤ 15 mol %; and 0 mol % ≤ $WO_3$ ≤ 10 mol %, wherein the $WO_3$ (mol %) plus the $MoO_3$ (mol %) is from 1 mol % to 19 mol %, wherein $R_2O$ (mol %) minus the $Al_2O_3$ (mol %) is from −12 mol % to 4 mol %, and further wherein the glass-ceramic comprises a glassy phase and at least one crystalline phase selected from the group consisting of a stoichiometric crystalline phase, a non-stoichiometric crystalline phase and a mixed stoichiometric and non-stoichiometric crystalline phase. In a related aspect, the substrate comprises: 40 mol % ≤ $SiO_2$ ≤ 80 mol %; 1 mol % ≤ $Al_2O_3$ ≤ 15 mol %; 3 mol % ≤ $B_2O_3$ ≤ 50 mol %; 0.01 mol % ≤ $V_2O_5$ ≤ 0.2 mol %; 0 mol % ≤ $R_2O$ ≤ 15 mol %, $R_2O$ is one or more of $Li_2O$, $Na_2O$, $K_2O$, $Rb_2O$ and $Cs_2O$; 0 mol % ≤ RO ≤ 2 mol %, RO is one or more of MgO, CaO, SrO and BaO; 0 mol % ≤ $P_2O_5$ ≤ 3 mol %; 0 mol % ≤ $SnO_2$ ≤ 0.5 mol %; 0 mol % ≤ $MoO_3$ ≤ 15 mol %; and 0.1 mol % ≤ $WO_3$ ≤ 10 mol %, wherein the $WO_3$ (mol %) plus the $MoO_3$ (mol %) is from 1 mol % to 19 mol %, and wherein $R_2O$ (mol %) minus the $Al_2O_3$ (mol %) is from −12 mol % to 4 mol %. The method of making a patterned article also includes heating a portion of the substrate to a temperature of 600° C. or greater to form a bleached portion and a non-bleached portion, wherein the bleached portion comprises a glassy phase, the glassy phase in the bleached portion at a greater concentration than the glassy phase in the non-bleached portion.

In some implementations of the foregoing method of making a patterned glass-ceramic article, the heating step is conducted with a laser source. Further, in some aspects, the bleached portion comprises an absorption level that differs no more than 10% from an absorption level of the non-bleached portion. In other aspects, the bleached portion comprises an absorption level that differs by at least 10% from an absorption level of the non-bleached portion. In another implementation, the method can further include a step of preheating the substrate from about 400° C. to about 550° C. prior to the heating step.

Depending on the optical density (OD) of a glass-ceramic of the disclosure, different wavelengths of radiation will have different heating profiles through the thickness of the sample. Since the color changes associated with heating is a dynamic effect it is believed that one can achieve the same results with different wavelengths by changing processing speed. However, it is preferable to control wavelength as part of the patterning process for glass-ceramics having a moderate transmissivity through the thickness of the sample (i.e., a total transmittance from about 20-40%) at a speed between about 20 to 50 mm/s to ensure that the heating zone is localized. At rapid scan speeds, the cooling rate is very high, which will also have to be considered because this rate plays a role in the resultant tungsten bronze formation and dissolution, and in-turn, the resultant optical absorbance of the glass ceramic.

As described previously, as the glass-ceramic materials of the disclosure are bleached, their NIR absorbance goes to zero. This is because the host glass is optically transparent in the NIR regime. Thus, if a laser operating in the NIR regime is used to bleach the material, as the thermal decomposition of the UV and NIR absorbing bronze phase occurs, the laser absorption goes to zero as the bronze phase decomposes. Thus, the laser heating and bleaching the glass-ceramics of the disclosure using NIR wavelengths is self-limiting. This can provide an advantage over laser bleaching with UV (e.g., 355 nm) or longer IR wavelength (e.g., 10.6 μm) sources because the host glass itself is highly absorptive in these regions and will continue to heat after the bronze crystals have decomposed. Thus, delicate and distortion-free patterning with higher resolution can be particularly successful with highly focused NIR lasers. Additionally, for certain glass-ceramic compositions, the decomposition of the bronze phase by selective laser heating can occur below the softening point of the glass. This can further enhance distortion-free laser patterning. It also enables the use of the glass-ceramic materials of the disclosure to form patterned articles (e.g., articles 100 depicted in FIG. 1, as patterned according to the foregoing methods) that serve as lens arrays with transparent apertures surrounded by NIR and UV blocking areas to prevent crosstalk, noise, and scatter between lens array elements.

According to a further embodiment, the foregoing methods of making a patterned glass-ceramic article are also applicable to the laminate articles outlined earlier. That is, the substrates 10 serving as the dual-clad of the laminate article are bleachable. Further, as the thicknesses 102 of the pair of substrates 10 in these laminates are typically smaller than the thickness 102 of the substrates employed in a single-ply article 100 (see FIG. 1), the foregoing patterning methods are particularly effective. That is, less energy is required to raise the local temperature of each of the substrates 10 serving as the clad layers to effect bleaching, facilitating lower cost patterning processing with less susceptibility to warping and other heat-induced defects.

EXAMPLES

The following examples represent certain non-limiting examples of the glass-ceramic materials and articles of the disclosure, including the methods of making them.

Figure 2:
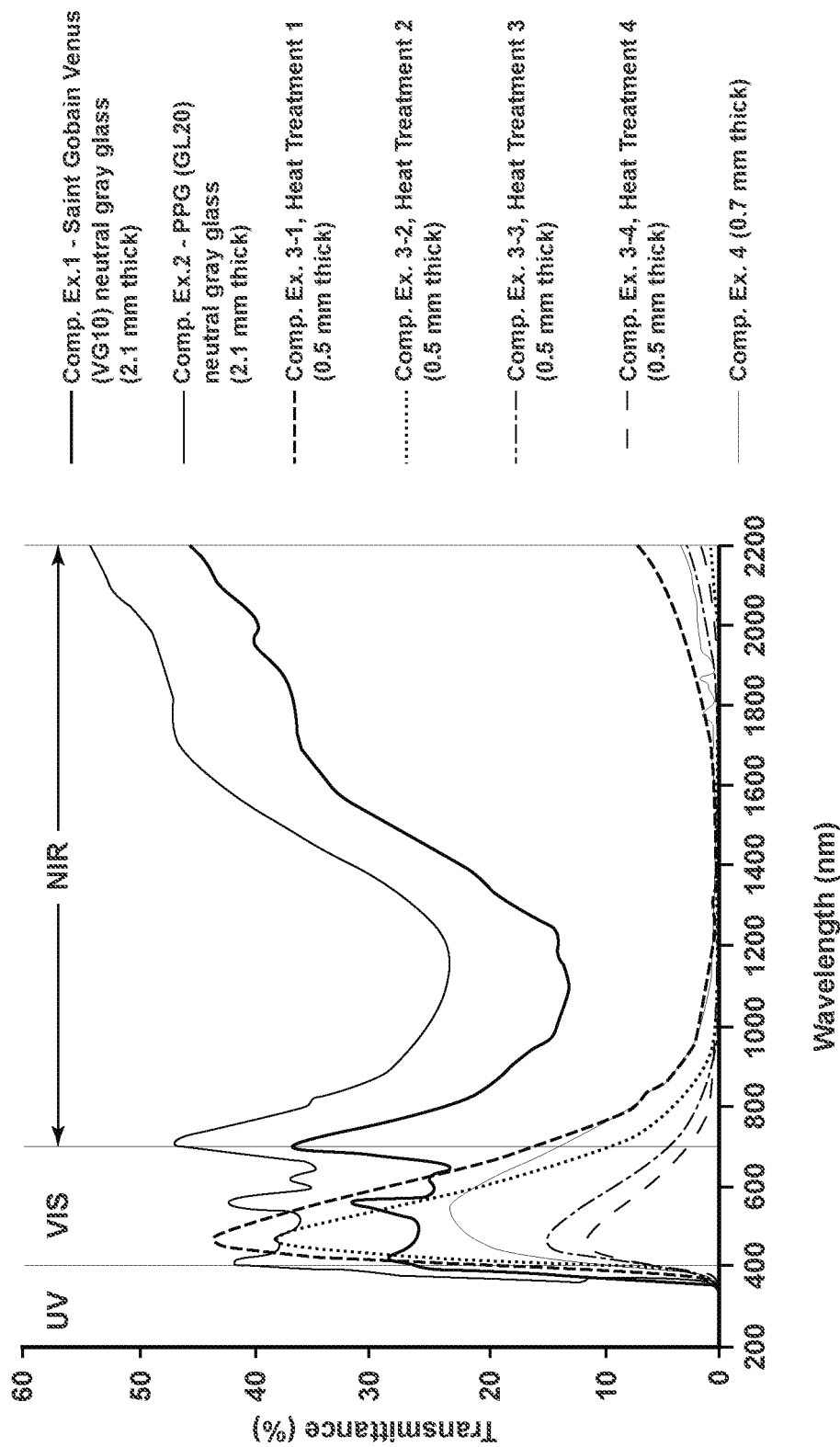
FIG. 2 is a plot of transmittance vs. wavelength of comparative neutral grey-tinted glass compositions, a comparative soft grey-tinted tungsten oxide-containing glass-ceramic composition and a comparative tungsten oxide-containing glass-ceramic composition subjected to various heat treatments.

Referring now to FIG. 2, a plot of transmittance vs. wavelength of a comparative Saint Gobain VG10 neutral grey-hued glass substrate having a thickness of 2.1 mm ("Comp. Ex. 1"); a PPG GL20 neutral grey-hued glass having a thickness of 2.1 mm ("Comp. Ex. 2"); a tungsten bronze glass-ceramic (with no molybdenum) substrate having a thickness of 0.5 mm ("Comp. Exs. 3-1 to 3-4); and a soft grey-hued tungsten bronze glass-ceramic substrate (with no molybdenum) having a thickness of 0.7 mm ("Comp. Ex. 4"). Further, the composition of the tungsten bronze glass-ceramic substrates, Comp. Exs. 3-1 to 3-4, is given by: 67.11 mol % $SiO_2$, 9.61 mol % $Al_2O_3$, 9.41 mol % $B_2O_3$, 3.84 mol % $Li_2O$, 4.41 mol % $Na_2O$, 1.59 mol % $K_2O$, 0.05 mol % $SnO_2$, 3.84 mol % $WO_3$, 0.13 mol % CaO, and 0.01 mol % $Fe_2O_3$. In addition, each of these samples was subjected to the following heat treatment conditions: (1) annealing at 570° C. for one hour and then cooled at a furnace rate to room temperature ("Heat Treatment 1"); (2) annealing at 570° C. for one hour, cooling at a furnace rate to room temperature, heat treating back to 550° C. for 30 minutes, cooling to 475° C. at 1° C./min, and then cooling at a furnace rate to room temperature ("Heat Treatment 2"); (3) annealing at 570° C. for one hour, cooling at a furnace rate to room temperature, heat treating back to 550° C. for 90 minutes, cooling to 475° C. at 1° C./min, and then cooling at a furnace rate to room temperature ("Heat Treatment 3"); and (4) annealing at 570° C. for one hour, cooling at a furnace rate to room temperature, heat treating back to 550°

C. for 120 minutes, cooling to 475° C. at 1° C./min, and then cooling at a furnace rate to room temperature ("Heat Treatment 4") (Comp. Exs. 3-1 to 3-4, respectively). Finally, the composition of the soft grey tungsten bronze glass-ceramic substrate, Comp. Ex. 4, is given by: 64.49 mol % $SiO_2$, 10.57 mol % $Al_2O_3$, 9.42 mol % $B_2O_3$, 6.51 mol % $Li_2O$, 5.01 mol % $Na_2O$, 0.03 mol % $K_2O$, 0.05 mol % $SnO_2$, 3.84 mol % $WO_3$, and 0.08 mol % CaO.

As is evident from the data depicted in FIG. 2, the tungsten bronze glass ceramic substrates (Comp. Exs. 3-1 to 3-4, and Comp. Ex. 4) demonstrate VIS and NIR transmittance levels about 4× and about 10× lower than respective VIS and NIR transmittance levels exhibited by conventional privacy glass substrates, VG10 and GL20 (Comp. Exs. 1-2, respectively), at path lengths on the order of about 4× shorter. In particular, these tungsten bronze glass ceramic substrates are transparent in the visible spectrum and NIR when molten, and therefore do not pose the types of melting challenges faced with conventional tinted glasses. More particularly, these tungsten bronze glass ceramics, upon further heat treatment, develop their tint and NIR absorbance capabilities through the formation of nanoscopic tungsten bronze crystals that are distributed throughout the glass. By varying the annealing and cooling rate of these glasses, the optical absorbance of a single composition can be tuned to have a transmittance ranging from 77% to 7% in the visible spectrum (400 to 700 nm) and 42.5% to 0.34% in the NIR (700 to 2200 nm) at a path length of 0.5 mm. Nevertheless, the relatively high tungsten content in these tungsten bronze glass ceramic substrates can make them fairly high in raw material cost. Indeed, the tungsten oxide employed in these tungsten bronze glass-ceramics can be more expensive than absorptive dopants employed in commercial tint glass (e.g., VG10 and GL20).

Mindful of the foregoing considerations and the data in FIG. 2, the glass-ceramics of the disclosure unexpectedly offer optical properties that are comparable (and, depending on the application, superior) to those exhibited by the tungsten bronze glass-ceramics (e.g., as exemplified by Comp. Exs. 3-1 to 3-4, and Comp. Ex. 4), but at substantially lower costs given that they have no tungsten or relatively low amounts of tungsten. Referring now to FIG. 3A, a plot is provided of transmittance vs. wavelength of comparative neutral grey-tinted glass compositions (Comp. Exs. 1 and 2), a comparative tungsten oxide-containing glass-ceramic composition subjected to a heat treatment (Comp. Ex. 3-4), and mixed tungsten oxide- and molybdenum oxide-containing glass-ceramics subjected to a heat treatment (Exs. 1 and 2), according to examples of the disclosure. The compositions of the comparative neutral grey-tinted glass substrates (Comp. Exs. 1 and 2) and tungsten oxide-containing glass-ceramic substrates (Comp. Ex. 3-4) are provided earlier in connection with the prior example. As for the mixed tungsten oxide- and molybdenum oxide-containing glass-ceramics subjected to a heat treatment (Exs. 1 and 2), these compositions are provided above in Table 1A. Further, each of the inventive substrates were subjected to the following heat treatment conditions after melting: 500° C. for 4 hours or 550° C. for 4 hours, each followed by cooling at 1° C./min to 475° C. (Exs. 1 and 2, respectively). Table 2, provided below, also provides selected transmittance data from FIG. 3A for particular wavelength ranges and the percentage of the solar spectrum blocked.

TABLE 2

| Average % transmittance | Comp. Ex. 1 (2.1 mm thick) | Comp. Ex. 3-4 (0.5 mm thick) | Ex. 1 (0.5 mm thick) | Ex. 2 (0.5 mm thick) |
|---|---|---|---|---|
| 400 to 700 nm | 27.9 | 7.5 | 4.2 | 9.3 |
| 700 to 1500 nm | 21.5 | 0.3 | 7.7 | 5 |
| 700 to 2000 nm | 25.9 | 0.2 | 21.1 | 12.7 |
| % solar spectrum blocked: | 75.1 | 96.4 | 92.3 | 92.1 |

As is evident from the data in FIG. 3A and the data listed in Table 2, the inventive mixed tungsten oxide- and molybdenum oxide-containing glass-ceramic substrates (Exs. 1 and 2) exhibit transmittance levels 3 to 4× lower than those exhibited by the comparative neutral grey-tinted glass substrates (Comp. Exs. 1 and 2) at thicknesses approximately 4× lower than Comp. Exs. 1 and 2 in each of the UV, visible and NIR regimes at the thickness values listed in FIG. 3A and Table 2 above. In addition, the inventive glass-ceramic substrates exhibit transmittance levels on the order of those exhibited by the comparative tungsten bronze glass-ceramic substrates (Comp. Ex. 3-4), particularly in the UV and visible spectrums. Further, it is evident from the data in Table 2 that the inventive glass-ceramic substrates (Exs. 1 and 2) offer a demonstrated ability to block comparable levels of the solar spectrum as the comparative tungsten bronze glass ceramics (Comp. Ex. 3-4) and significantly more of the solar spectrum relative to one of the comparative grey-tinted glass compositions (Comp. Ex. 1).

Referring now to FIG. 3B, a plot is provided of absorbance vs. wavelength of comparative neutral grey-tinted glass compositions (Comp. Exs. 1 and 2) and mixed tungsten oxide- and molybdenum oxide-containing glass-ceramics subjected to a heat treatment (Exs. 1 and 2), according to examples of the disclosure. As is evident from FIG. 3B, the inventive mixed tungsten oxide- and molybdenum oxide-containing glass-ceramic substrates (Exs. 1 and 2) exhibit absorbance levels that are about 12 to 18× higher than those exhibited by the comparative neutral grey-tinted glass substrates (Comp. Exs. 1 and 2) in the UV and visible spectrums. Further, the inventive mixed tungsten oxide- and molybdenum oxide-containing glass-ceramic substrates (Exs. 1 and 2) exhibit absorbance levels that are about an order of magnitude higher than those exhibited by the comparative neutral grey-tinted glass substrates (Comp. Exs. 1 and 2) in the NIR spectrum. As absorbance is reported in units of OD/mm in FIG. 3B, these results are normalized for substrate thickness, meaning that these inventive glass-ceramic substrates are particularly well-suited for use in vehicular window applications, where minimizing thickness is of high importance.

Turning to FIG. 4A, a plot of transmittance vs. wavelength of a comparative PPG GL20 neutral grey-hued glass substrate having a thickness of 2.13 mm ("Comp. Ex. 2") and pure molybdenum oxide-containing glass-ceramic substrates having a thickness of 100 microns and subjected to two differing heat treatments (Exs. 3-1 and 3-2). The composition of the inventive pure molybdenum oxide-containing glass-ceramic substrates (Exs. 3-1 and 3-2) is given by Ex. 3 in Table 1B above. In addition, the inventive substrates, Ex. 3-1 and 3-2, were rapidly quenched between two iron plates after melting and then subjected to heat treatments at 700° C. heat for 10 minutes and 20 minutes, respectively.

As is evident from the data in FIG. 4A, the inventive pure molybdenum oxide-containing glass-ceramic substrates (Exs. 3-1 and 3-2) exhibit transmittance levels that are significantly lower than those exhibited by the comparative neutral grey-tinted glass substrates (Comp. Ex. 2) in each of the UV, visible and NIR regimes. In addition, the inventive glass-ceramic substrates are significantly thinner than the comparative neutral grey-tinted glass substrates, with about a 21× shorter path length. Accordingly, FIG. 4B, which provides absorbance levels (OD/cm) vs. wavelength for these same substrates to normalize thickness, demonstrates that the inventive pure molybdenum oxide-containing glass-ceramic substrates (Exs. 3-1 and 3-2) exhibit absorbance levels that are one to two orders of magnitude higher than the absorbance levels exhibited by the comparative neutral grey-tinted glass substrates (Comp. Ex. 2) in each of the UV, visible and NIR spectrums.

Referring now to FIG. 5, plots are provided of transmittance vs. wavelength of an unbleached and a bleached mixed tungsten oxide- and molybdenum oxide-containing glass-ceramic substrate at 0.5 mm thickness (Exs. 4-1 and 4-2, respectively) subjected to a heat treatment, according to examples of the disclosure. In particular, the inventive glass-ceramic substrates were fabricated with the Ex. 4 composition listed above in Table 1A. The unbleached samples (Ex. 4-1) were melt-quenched, annealed and subjected to a heat treatment according to the following conditions: hold at 550° C. for 12 hours, cooled to 475° C. at 1° C. per minute, and then cooled at a furnace rate to room temperature. The bleached samples (Ex. 4-2) were derived from the unbleached samples, but subjected to further high energy processing according to the following conditions: a five (5) second exposure to a high intensity infrared lamp (a Research, Inc. Spot Heater Model 4085 infrared heat lamp). As is evident from the data in FIG. 5, the unbleached samples (Ex. 4-1) demonstrated low transmittance and high absorbance levels across the UV, visible and NIR regimes. Conversely, the bleached samples (Ex. 4-2) demonstrated high transmittance and low absorbance levels across the UV, visible and NIR regimes. As such, it is apparent that the bleaching process drives the crystalline phases present in the unbleached samples back into solution, thus significantly changing the optical properties of the substrates. Accordingly, high energy processing, such as outlined earlier in the disclosure, can be employed to selectively pattern all or portions of glass-ceramic substrates to locally change their optical properties. Further, different energy levels can be employed to obtain transmittance and absorbance levels that fall within the extremes exemplified by the data provided in FIG. 5.

Referring now to FIG. 6, a plot is provided of transmittance vs. wavelength of substrates having a mixed vanadium and tungsten oxide-containing glass-ceramic composition, as subjected to various heat treatment conditions (Exs. 33-1 to 33-9), according to examples of the disclosure. Each of the tested samples has a thickness of 0.5 mm. Further, the composition of these samples is given by Ex. 33 in Table 1C. With regard to the heat treatment conditions, the Ex. 33-1 sample was tested in an as-annealed state and the remaining samples, Exs. 33-2 to 33-9, were subjected to additional heat treatments. In particular, the following heat treatment conditions were employed: 550° C. for 1 min and cooled at 1° C./min to 475° C. (Ex. 33-2); 550° C. for 30 min and cooled at 1° C./min to 475° C. (Ex. 33-3); 550° C. for 60 min and cooled at 1° C./min to 475° C. (Ex. 33-4); 550° C. for 90 min and cooled at 1° C./min to 475° C. (Ex. 33-5); 550° C. for 120 min and cooled at 1° C./min to 475° C. (Ex. 33-6); 525° C. for 60 min and cooled at 1° C./min to 450° C. (Ex. 33-7); 525° C. for 120 min and cooled at 1° C./min to 450° C. (Ex. 33-8); and 525° C. for 240 min and cooled at 1° C./min to 450° C. (Ex. 33-9). After reaching the final set point, the samples were then furnace cooled to room temperature.

As shown in FIG. 6, each of the substrates having a mixed vanadium and tungsten oxide-containing glass-ceramic composition (Exs. 33-1 to 33-9) produce a similar spectrum in a wavelength range from 200 nm to 3200 nm that varies as a function of the specified heat treatment. Notably, the spectrum of the as-annealed sample that was not subjected to any further heat treatment (Ex. 33-1) is generally indicative of the lowest transmittance as a function of wavelength for the samples in this figure, recognizing that its visible transmittance is slightly higher than a few other heat-treated samples. As the samples are subjected to varying heat treatments (e.g., Exs. 33-2 to 33-9), the spectra changes with higher transmittance levels from about 600 nm to about 2600 nm. Further, visual observation of these samples confirms that these heat treatments result in the development of neutral grey and varying bronze/gold brown colors in the substrates (e.g., in Exs. 33-2 to 33-9).

Aspect (1) of this disclosure pertains to a glass-ceramic, comprising: 40 mol %≤$SiO_2$≤80 mol %; 1 mol %≤$Al_2O_3$≤15 mol %; 3 mol %≤$B_2O_3$≤50 mol %; 0 mol %≤$R_2O$≤15 mol %, $R_2O$ is one or more of $Li_2O$, $Na_2O$, $K_2O$ $Rb_2O$ and $Cs_2O$; 0 mol %≤RO≤2 mol %, RO is one or more of MgO, CaO, SrO and BaO; 0 mol %≤$P_2O_5$≤3 mol %; 0 mol %≤$SnO_2$≤0.5 mol %; 0.1 mol %≤$MoO_3$≤15 mol %; and 0 mol %≤$WO_3$≤10 mol %, wherein the $WO_3$ (mol %) plus the $MoO_3$ (mol %) is from 1 mol % to 19 mol %, and further wherein $R_2O$ (mol %) minus the $Al_2O_3$ (mol %) is from −12 mol % to 4 mol %.

Aspect (2) of this disclosure pertains to the glass-ceramic of Aspect (1), further comprising: 50 mol %≤$SiO_2$≤75 mol %; 5 mol %≤$Al_2O_3$≤15 mol %; 5 mol %≤$B_2O_3$≤25 mol %; 2 mol %≤$R_2O$≤14 mol %, $R_2O$ is one or more of $Li_2O$, $Na_2O$, $K_2O$, $Rb_2O$ and $Cs_2O$; 0 mol %≤RO≤1 mol %, RO is one or more of MgO, CaO, SrO and BaO; 0 mol %≤$P_2O_5$≤2 mol %; 0.1 mol %≤$MoO_3$≤7 mol %; and 0 mol %≤$WO_3$≤3 mol %, wherein the $WO_3$ (mol %) plus the $MoO_3$ (mol %) is from 2 mol % to 10 mol %, and further wherein $R_2O$ (mol %) minus the $Al_2O_3$ (mol %) is from −10 mol % to 3 mol %.

Aspect (3) of this disclosure pertains to the glass-ceramic of Aspect (1) or Aspect (2), further comprising: 60 mol %≤$SiO_2$≤72 mol %; 7 mol %≤$Al_2O_3$≤12 mol %; 8 mol %≤$B_2O_3$≤20 mol %; 3 mol %≤$R_2O$≤13 mol %, $R_2O$ is one or more of $Li_2O$, $Na_2O$, $K_2O$, $Rb_2O$ and $Cs_2O$; 0.01 mol %≤RO≤0.5 mol %, RO is one or more of MgO, CaO, SrO and BaO; 0 mol %≤$P_2O_5$≤1.5 mol %; 0.1 mol %≤$MoO_3$≤4.1 mol %; and 0 mol %≤$WO_3$≤2 mol %, wherein the $WO_3$ (mol %) plus the $MoO_3$ (mol %) is from 3 mol % to 6 mol %, and further wherein $R_2O$ (mol %) minus the $Al_2O_3$ (mol %) is from −8 mol % to 1.5 mol %.

Aspect (4) of this disclosure pertains to the glass-ceramic of any one of Aspects (1) through (3), wherein the glass-ceramic comprises a thickness from about 0.05 mm to about 0.5 mm and a total transmittance from about 4% to about 30% in the visible spectrum from 400 nm to 700 nm.

Aspect (5) of this disclosure pertains to the glass-ceramic of any one of Aspects (1) through (4), wherein the glass-ceramic comprises a thickness from about 0.05 mm to about 0.5 mm and a total transmittance from about 5% to about 15% in the near infrared (NIR) spectrum from 700 nm to 1500 nm.

Aspect (6) of this disclosure pertains to the glass-ceramic of any one of Aspects (1) through (5), wherein the glass-ceramic comprises a thickness from about 0.05 mm to about 0.5 mm and a total transmittance of less than or equal to 1% at ultraviolet (UV) wavelengths below 370 nm and less than or equal to 5% at UV wavelengths between 370 nm and 390 nm.

Aspect (7) of this disclosure pertains to the glass-ceramic of any one of Aspects (1) through (6), wherein the glass-ceramic comprises a thickness from about 0.05 mm to about 0.5 mm and a total transmittance from about 4% to about 10% in the visible spectrum from 400 nm to 700 nm.

Aspect (8) of this disclosure pertains to the glass-ceramic of any one of Aspects (1) through (7), wherein the glass-ceramic comprises an absorbance from 3.3 optical density units (OD)/mm to 24.0 OD/mm in ultraviolet (UV) wavelengths from 280 nm to 380 nm, an absorbance from 0.1 OD/mm to 12.0 OD/mm in visible wavelengths from 400 nm to 700 nm, an absorbance from 0.05 OD/mm to 10.4 OD/mm in near infrared (NIR) wavelengths from 700 nm to 2000 nm, and 0.05 OD/m to 10.1 OD/mm in NIR wavelengths from 800 nm to 2500 nm.

Aspect (9) of this disclosure pertains to the glass-ceramic of any one of Aspects (1) through (8), wherein the glass-ceramic further comprises 3 mol %≤$MoO_3$≤10 mol %, and 0 mol %≤$WO_3$≤trace amounts.

Aspect (10) of this disclosure pertains to the glass-ceramic of Aspect (9), wherein the glass-ceramic comprises an absorbance from 3.3 optical density units (OD)/mm to 24.0 OD/mm in ultraviolet (UV) wavelengths from 280 nm to 380 nm, an absorbance from 0.1 OD/mm to 12.0 OD/mm in visible wavelengths from 400 nm to 700 nm, an absorbance from 0.05 OD/mm to 10.4 OD/mm in near infrared (NIR) wavelengths from 700 nm to 2000 nm, and 0.05 OD/m to 10.1 OD/mm in NIR wavelengths from 800 nm to 2500 nm.

Aspect (11) of this disclosure pertains to the glass-ceramic of any one of Aspects (1) through (10), wherein the glass-ceramic further comprises 0.1 mol %≤$WO_3$≤7 mol %.

Aspect (12) of this disclosure pertains to the glass-ceramic of Aspect (11), wherein the glass-ceramic comprises an absorbance from 3.3 optical density units (OD)/mm to 7.2 OD/mm in ultraviolet (UV) wavelengths from 280 nm to 380 nm, an absorbance from 0.1 OD/mm to 5.0 OD/mm in visible wavelengths from 400 nm to 700 nm, an absorbance from 0.05 OD/mm to 9.6 OD/mm in near infrared (NIR) wavelengths from 700 nm to 2000 nm, and 0.05 OD/m to 7.5 OD/mm in NIR wavelengths from 800 nm to 2500 nm.

Aspect (13) of this disclosure pertains to a glass-ceramic comprising: 40 mol %≤$SiO_2$≤80 mol %; 1 mol %≤$Al_2O_3$≤15 mol %; 3 mol %≤$B_2O_3$≤50 mol %; 0 mol %≤$R_2O$≤15 mol %, $R_2O$ is one or more of $Li_2O$, $Na_2O$, $K_2O$, $Rb_2O$ and $Cs_2O$; 0 mol %≤RO≤2 mol %, RO is one or more of MgO, CaO, SrO and BaO; 0 mol %≤$P_2O_5$≤3 mol %; 0 mol %≤$SnO_2$≤0.5 mol %; 0.1 mol %≤$MoO_3$≤15 mol %; and 0 mol %≤$WO_3$≤10 mol %, wherein the $WO_3$ (mol %) plus the $MoO_3$ (mol %) is from 1 mol % to 19 mol %, wherein $R_2O$ (mol %) minus the $Al_2O_3$ (mol %) is from −12 mol % to 4 mol %, and further wherein the glass-ceramic comprises a glassy phase and at least one crystalline phase selected from the group consisting of a stoichiometric crystalline phase, a non-stoichiometric crystalline phase and a mixed stoichiometric and non-stoichiometric crystalline phase.

Aspect (14) of this disclosure pertains to the glass-ceramic of Aspect (13), further comprising: 50 mol %≤$SiO_2$≤75 mol %; 5 mol %≤$Al_2O_3$≤15 mol %; 5 mol %≤$B_2O_3$≤25 mol %; 2 mol %≤$R_2O$≤14 mol %, $R_2O$ is one or more of $Li_2O$, $Na_2O$, $K_2O$, $Rb_2O$ and $Cs_2O$; 0 mol %≤RO≤1 mol %, RO is one or more of MgO, CaO, SrO and BaO; 0 mol %≤$P_2O_5$≤2 mol %; 0.1 mol %≤$MoO_3$≤7 mol %; and 0 mol %≤$WO_3$≤3 mol %, wherein the $WO_3$ (mol %) plus the $MoO_3$ (mol %) is from 2 mol % to 10 mol %, and further wherein $R_2O$ (mol %) minus the $Al_2O_3$ (mol %) is from −10 mol % to 3 mol %.

Aspect (15) of this disclosure pertains to the glass-ceramic of Aspect (13) or Aspect (14), further comprising: 60 mol %≤$SiO_2$≤72 mol %; 7 mol %≤$Al_2O_3$≤12 mol %; 8 mol %≤$B_2O_3$≤20 mol %; 3 mol %≤$R_2O$≤13 mol %, $R_2O$ is one or more of $Li_2O$, $Na_2O$, $K_2O$, $Rb_2O$ and $Cs_2O$; 0.01 mol %≤RO≤0.5 mol %, RO is one or more of MgO, CaO, SrO and BaO; 0 mol %≤$P_2O_5$≤1.5 mol %; 0.1 mol %≤$MoO_3$≤4.1 mol %; and 0 mol %≤$WO_3$—≤2 mol %, wherein the $WO_3$ (mol %) plus the $MoO_3$ (mol %) is from 3 mol % to 6 mol %, and further wherein $R_2O$ (mol %) minus the $Al_2O_3$ (mol %) is from −8 mol % to 1.5 mol %.

Aspect (16) of this disclosure pertains to a glass-ceramic of any one of Aspects (13) through (15), wherein the glass-ceramic further comprises 3 mol %≤$MoO_3$≤10 mol %, and 0 mol %≤$WO_3$≤trace amounts.

Aspect (17) of this disclosure pertains to a glass-ceramic of any one of Aspects (13) through (16), wherein the at least one crystalline phase comprises a crystalline phase of $M_xWO_3$ and/or $M_yMoO_3$, wherein M is at least one of H, Li, Na, K, Rb, Cs, Mg, Ca, Sr, Sn, P, S, Ti, V, Cr, Mn, Fe, Co, Ni, Cu, Ga, Se, Zr, Nb, Ru, Rh, Pd, Ag, Cd, In, Sb, Te, La, Ce, Pr, Nd, Sm, Eu, Gd, Tb, Dy, Ho, Er, Tm, Yb, Lu, Ta, Os, Ir, Pt, Au, Tl, Pb, Bi, and U, and wherein 0≤x≤1 and 0≤y≤1.

Aspect (18) of this disclosure pertains to a glass-ceramic of any one of Aspects (13) through (17), wherein the at least one crystalline phase comprises ternary metal oxides of the general formula $M'_xM''_yO_z$, where M" is a transition metal or a combination of transition metals, M' is a metal or a combination of metals that differ from M", 2≤z≤5, and x and y are based on z and the valence of M' and M".

Aspect (19) pertains to a window comprising: a substrate having a thickness from about 0.1 mm to about 3 mm, the substrate further comprising: (a) a total transmittance from about 4% to about 30% in the visible spectrum from 400 nm to 700 nm; (b) a total transmittance of less than or equal to 1% at ultraviolet (UV) wavelengths below 370 nm and less than or equal to 5% at UV wavelengths between 370 nm and 390 nm; and (c) a total transmittance from about 5% to about 15% in the near infrared (NIR) spectrum from 700 nm to 1500 nm.

Aspect (20) pertains to the window of Aspect (19), wherein the window does not include a IR-shielding layer.

Aspect (21) pertains to the window of Aspect (19) or Aspect (20), wherein the substrate comprises a glass-ceramic composition, wherein the glass-ceramic composition comprises: 40 mol %≤$SiO_2$≤80 mol %; 1 mol %≤$Al_2O_3$≤15 mol %; 3 mol %≤$B_2O_3$≤50 mol %; 0 mol %≤$R_2O$≤15 mol %, $R_2O$ is one or more of $Li_2O$, $Na_2O$, $K_2O$, $Rb_2O$ and $Cs_2O$; 0 mol %≤RO≤2 mol %, RO is one or more of MgO, CaO, SrO and BaO; 0 mol %≤$P_2O_5$≤3 mol %; 0 mol %≤$SnO_2$≤0.5 mol %; 0.1 mol %≤$MoO_3$≤15 mol %; and 0 mol %≤$WO_3$≤10 mol %, wherein the $WO_3$ (mol %) plus the $MoO_3$ (mol %) is from 1 mol % to 19 mol %, and further wherein $R_2O$ (mol %) minus the $Al_2O_3$ (mol %) is from −12 mol % to 4 mol %.

Aspect (22) pertains to the window of any one of Aspects (19) through (21), wherein the window is configured for a vehicular roof.

Aspect (23) pertains to the window of Aspect (22), wherein the substrate has a thickness from about 0.1 mm to about 1 mm.

Aspect (24) pertains to the window of Aspect (23), wherein the substrate further comprises a total transmittance from about 4% to about 10% in the visible spectrum from 400 nm to 700 nm.

Aspect (25) pertains to a method of making a glass-ceramic, comprising:

mixing a batch comprising: 40 mol %≤$SiO_2$≤80 mol %; 1 mol %≤$Al_2O_3$≤15 mol %; 3 mol %≤$B_2O_3$≤50 mol %; 0 mol %≤$R_2O$≤15 mol %, $R_2O$ is one or more of $Li_2O$, $Na_2O$, $K_2O$ $Rb_2O$ and $Cs_2O$; 0 mol %≤RO≤2 mol %, RO is one or more of MgO, CaO, SrO and BaO; 0 mol %≤$P_2O_5$≤3 mol %; 0 mol %≤$SnO_2$≤0.5 mol %; 0.1 mol %≤$MoO_3$≤15 mol %; and 0 mol %≤$WO_3$≤10 mol %, wherein the $WO_3$ (mol %) plus the $MoO_3$ (mol %) is from 1 mol % to 19 mol %, and further wherein $R_2O$ (mol %) minus the $Al_2O_3$ (mol %) is from −12 mol % to 4 mol %; melting the batch between about 1500° C. and about 1700° C. to form a melt; and annealing the melt between about 500° C. and about 600° C. to define an annealed melt; and heat treating the annealed melt between about 500° C. and about 1000° C. from about 5 minutes to about 48 hours to form the glass-ceramic.

Aspect (26) pertains to the method of Aspect (25), wherein the heat treating comprises heat treating the annealed melt between about 500° C. and about 800° C. from about 5 minutes to about 24 hours to form the glass-ceramic.

Aspect (27) pertains to the method of Aspect (25) or Aspect (26), further comprising: reducing the melt to a plurality of particles; re-mixing the melt comprising a plurality of particles into a second batch; re-melting the second batch between about 1500° C. and about 1700° C. to form a second melt, wherein the reducing, re-mixing and re-melting steps are conducted after the step of melting the batch and before the step of annealing the melt, and further wherein the melt in the step of annealing is the second melt.

Aspect (28) pertains to a method of making a patterned glass-ceramic article, comprising: providing a substrate having a glass-ceramic composition comprising: 40 mol %≤$SiO_2$≤80 mol %; 1 mol %≤$Al_2O_3$≤15 mol %; 3 mol %≤$B_2O_3$≤50 mol %; 0 mol %≤$R_2O$≤15 mol %, $R_2O$ is one or more of $Li_2O$, $Na_2O$, $K_2O$, $Rb_2O$ and $Cs_2O$; 0 mol %≤RO≤2 mol %, RO is one or more of MgO, CaO, SrO and BaO; 0 mol %≤$P_2O_5$≤3 mol %; 0 mol %≤$SnO_2$≤0.5 mol %; 0.1 mol %≤$MoO_3$≤15 mol %; and 0 mol %≤$WO_3$≤10 mol %, wherein the $WO_3$ (mol %) plus the $MoO_3$ (mol %) is from 1 mol % to 19 mol %, wherein $R_2O$ (mol %) minus the $Al_2O_3$ (mol %) is from −12 mol % to 4 mol %, and further wherein the glass-ceramic comprises a glassy phase and at least one crystalline phase selected from the group consisting of a stoichiometric crystalline phase, a non-stoichiometric crystalline phase and a mixed stoichiometric and non-stoichiometric crystalline phase; and heating a portion of the substrate to a temperature of 600° C. or greater to form a bleached portion and a non-bleached portion, wherein the bleached portion comprises a glassy phase, the glassy phase in the bleached portion at a greater concentration than the glassy phase in the non-bleached portion.

Aspect (29) pertains to the method of Aspect (28), wherein the heating step is conducted with a laser source.

Aspect (30) pertains to the method of Aspect (28) or Aspect (29), wherein the bleached portion comprises an absorption that differs no more than 10% from an absorption of the non-bleached portion.

Aspect (31) pertains to the method of any one of Aspects (28) through (30), wherein the bleached portion comprises an absorption that differs by at least 10% from an absorption of the non-bleached portion.

Aspect (32) pertains to the method of any one of Aspects (28) through (31), further comprising: preheating the substrate from about 400° C. to about 550° C. prior to the heating step.

Aspect (33) pertains to a glass-ceramic comprising: 40 mol %≤$SiO_2$≤80 mol %; 1 mol %≤$Al_2O_3$≤15 mol %; 3 mol %≤$B_2O_3$≤50 mol %; 0 mol %≤$R_2O$≤15 mol %, $R_2O$ is one or more of $Li_2O$, $Na_2O$, $K_2O$, $Rb_2O$ and $Cs_2O$; 0 mol %≤RO≤2 mol %, RO is one or more of MgO, CaO, SrO and BaO; 0 mol %≤$P_2O_5$≤3 mol %; 0 mol %≤$SnO_2$≤0.5 mol %; 0.01 mol % $V_2O_5$≤0.2 mol %; 0 mol %≤$MoO_3$≤15 mol %; and 0.1 mol %≤$WO_3$≤10 mol %, wherein the $WO_3$ (mol %) plus the $MoO_3$ (mol %) is from 1 mol % to 19 mol %, and further wherein $R_2O$ (mol %) minus the $Al_2O_3$ (mol %) is from −12 mol % to 4 mol %.

Aspect (34) pertains to the glass-ceramic of Aspect (33), wherein 0.02 mol % $V_2O_5$≤0.1 mol %.

Aspect (35) pertains to the glass-ceramic of Aspect (34) or Aspect (34), wherein the glass-ceramic further comprises a glassy phase and at least one crystalline phase selected from the group consisting of a stoichiometric crystalline phase, a non-stoichiometric crystalline phase and a mixed stoichiometric and non-stoichiometric crystalline phase.

While exemplary embodiments and examples have been set forth for the purpose of illustration, the foregoing description is not intended in any way to limit the scope of disclosure and appended claims. Accordingly, variations and modifications may be made to the above-described embodiments and examples without departing substantially from the spirit and various principles of the disclosure. All such modifications and variations are intended to be included herein within the scope of this disclosure and protected by the following claims.

What is claimed is:

1. A glass-ceramic, comprising:
40 mol %≤$SiO_2$≤80 mol %;
1 mol %≤$Al_2O_3$≤15 mol %;
3 mol %≤$B_2O_3$≤50 mol %;
0 mol %≤$R_2O$≤15 mol %, $R_2O$ is one or more of $Li_2O$, $Na_2O$, $K_2O$ $Rb_2O$ and $Cs_2O$;
0 mol %≤RO≤2 mol %, RO is one or more of MgO, CaO, SrO and BaO;
0 mol %≤$P_2O_5$≤3 mol %;
0 mol %≤$SnO_2$≤0.5 mol %;
0.1 mol %≤$MoO_3$≤15 mol %; and
0 mol %≤$WO_3$≤10 mol %,
wherein the $WO_3$ (mol %) plus the $MoO_3$ (mol %) is from 1 mol % to 19 mol %, and
further wherein $R_2O$ (mol %) minus the $Al_2O_3$ (mol %) is from −10 mol % to 3 mol %.

2. The glass-ceramic of claim 1, further comprising:
50 mol %≤$SiO_2$≤75 mol %;
5 mol %≤$Al_2O_3$≤15 mol %;
5 mol %≤$B_2O_3$≤25 mol %;
2 mol %≤$R_2O$≤14 mol %, $R_2O$ is one or more of $Li_2O$, $Na_2O$, $K_2O$, $Rb_2O$ and $Cs_2O$;
0 mol %≤RO≤1 mol %, RO is one or more of MgO, CaO, SrO and BaO;
0 mol %≤$P_2O_5$≤2 mol %;
0.1 mol %≤$MoO_3$≤7 mol %; and
0 mol %≤$WO_3$≤3 mol %,
wherein the $WO_3$ (mol %) plus the $MoO_3$ (mol %) is from 2 mol % to 10 mol %.

3. The glass-ceramic of claim 1, wherein the glass-ceramic comprises a thickness from about 0.05 mm to about 0.5 mm and any one of a total transmittance from about 4% to about 30% in the visible spectrum from 400 nm to 700 nm,
  a total transmittance from about 5% to about 15% in the near infrared (NIR) spectrum from 700 nm to 1500 nm,
  a total transmittance of less than or equal to 1% at ultraviolet (UV) wavelengths below 370 nm and less than or equal to 5% at UV wavelengths between 370 nm and 390 nm, and a total transmittance from about 4% to about 10% in the visible spectrum from 400 nm to 700 nm.

4. The glass-ceramic of claim 1, wherein the glass-ceramic comprises an absorbance from 3.3 optical density units (OD)/mm to 24.0 OD/mm in ultraviolet (UV) wavelengths from 280 nm to 380 nm, an absorbance from 0.1 OD/mm to 12.0 OD/mm in visible wavelengths from 400 nm to 700 nm, an absorbance from 0.05 OD/mm to 10.4 OD/mm in near infrared (NIR) wavelengths from 700 nm to 2000 nm, and 0.05 OD/m to 10.1 OD/mm in NIR wavelengths from 800 nm to 2500 nm.

5. The glass-ceramic of claim 1, wherein the glass-ceramic further comprises 3 mol %≤$MoO_3$≤10 mol %, and 0 mol %≤$WO_3$≤trace amounts.

6. The glass-ceramic of claim 5, wherein the glass-ceramic comprises an absorbance from 3.3 optical density units (OD)/mm to 24.0 OD/mm in ultraviolet (UV) wavelengths from 280 nm to 380 nm, an absorbance from 0.1 OD/mm to 12.0 OD/mm in visible wavelengths from 400 nm to 700 nm, an absorbance from 0.05 OD/mm to 10.4 OD/mm in near infrared (NIR) wavelengths from 700 nm to 2000 nm, and 0.05 OD/m to 10.1 OD/mm in NIR wavelengths from 800 nm to 2500 nm.

7. The glass-ceramic of claim 1, wherein the glass-ceramic further comprises 0.1 mol %≤$WO_3$≤7 mol %.

8. The glass-ceramic of claim 7, wherein the glass-ceramic comprises an absorbance from 3.3 optical density units (OD)/mm to 7.2 OD/mm in ultraviolet (UV) wavelengths from 280 nm to 380 nm, an absorbance from 0.1 OD/mm to 5.0 OD/mm in visible wavelengths from 400 nm to 700 nm, an absorbance from 0.05 OD/mm to 9.6 OD/mm in near infrared (NIR) wavelengths from 700 nm to 2000 nm, and 0.05 OD/m to 7.5 OD/mm in NIR wavelengths from 800 nm to 2500 nm.

9. The glass-ceramic of claim 1, wherein the glass-ceramic comprises a glassy phase and at least one crystalline phase selected from the group consisting of a stoichiometric crystalline phase, a non-stoichiometric crystalline phase and a mixed stoichiometric and non-stoichiometric crystalline phase.

10. The glass-ceramic of claim 9, wherein 3 mol %≤$MoO_3$≤10 mol % and 0 mol %≤$WO_3$≤trace amounts.

11. The glass-ceramic of claim 9, wherein the at least one crystalline phase comprises a crystalline phase of $M_xWO_3$ and/or $M_yMoO_3$, wherein M is at least one of H, Li, Na, K, Rb, Cs, Mg, Ca, Sr, Sn, P, S, Ti, V, Cr, Mn, Fe, Co, Ni, Cu, Ga, Se, Zr, Nb, Ru, Rh, Pd, Ag, Cd, In, Sb, Te, La, Ce, Pr, Nd, Sm, Eu, Gd, Tb, Dy, Ho, Er, Tm, Yb, Lu, Ta, Os, Ir, Pt, Au, Tl, Pb, Bi, and U, and wherein 0≤x≤1 and 0≤y≤1.

12. The glass-ceramic of claim 9, wherein the at least one crystalline phase comprises ternary metal oxides of the general formula $M'_xM''_yO_z$, where M" is a transition metal or a combination of transition metals, M' is a metal or a combination of metals that differ from M", 2≤z≤5, and x and y are based on z and the valence of M' and M".

13. A glass-ceramic, comprising:

40 mol %≤$SiO_2$≤80 mol %;

1 mol %≤$Al_2O_3$≤15 mol %;

3 mol %≤$B_2O_3$≤50 mol %;

0 mol %≤$R_2O$≤15 mol %, $R_2O$ is one or more of $Li_2O$, $Na_2O$, $K_2O$ $Rb_2O$ and $Cs_2O$;

0 mol %≤RO≤2 mol %, RO is one or more of MgO, CaO, SrO and BaO;

0 mol %≤$P_2O_5$≤3 mol %;

0 mol %≤$SnO_2$≤0.5 mol %;

wherein $R_2O$ (mol %) minus the $Al_2O_3$ (mol %) is from −12 mol % to 4 mol %, wherein the glass-ceramic comprises a glassy phase and at least one crystalline phase selected from the group consisting of a stoichiometric crystalline phase, a non-stoichiometric crystalline phase and a mixed stoichiometric and non-stoichiometric crystalline phase, and wherein the glass-ceramic further comprises 3 mol %≤$MoO_3$≤10 mol %, and 0 mol %≤$WO_3$≤trace amounts.

* * * * *

UNITED STATES PATENT AND TRADEMARK OFFICE
CERTIFICATE OF CORRECTION

| | |
|---|---|
| PATENT NO. | : 11,746,041 B2 |
| APPLICATION NO. | : 16/769899 |
| DATED | : September 5, 2023 |
| INVENTOR(S) | : Matthew John Dejneka et al. |

It is certified that error appears in the above-identified patent and that said Letters Patent is hereby corrected as shown below:

On the Title Page

On the page 2, item (56), in Column 1, under "Other Publications", Line 6, delete "Informine," and insert -- Infomine, --.
On the page 2, item (56), in Column 1, under "Other Publications", Line 21, delete "el" and insert -- et --.
On the page 2, item (56), in Column 2, under "Other Publications", Line 4, delete "Quarternary" and insert -- Quaternary --.
On the page 2, item (56), in Column 2, under "Other Publications", Line 51, delete "Opticial" and insert -- Optical --.
On the page 2, item (56), in Column 2, under "Other Publications", Line 53, delete "etal.," and insert -- et al., --.
On the page 2, item (56), in Column 2, under "Other Publications", Line 56, delete "znd" and insert -- and --.
On the page 2, item (56), in Column 2, under "Other Publications", Line 69, delete "nanopartides,"" and insert -- nanoparticles," --.
On the page 3, item (56), in Column 1, under "Other Publications", Line 4, delete "Saint Gobian," and insert -- Saint Gobain, --.

In the Claims

In Column 36, Line 44, in Claim 1, delete "K₂O" and insert -- $K_2O$, --.
In Column 36, Line 65, in Claim 2, after "mol %," insert -- and --.
In Column 38, Line 28, in Claim 13, delete "K₂O" and insert -- $K_2O$, --.

Signed and Sealed this
Sixteenth Day of April, 2024

Katherine Kelly Vidal
*Director of the United States Patent and Trademark Office*